(12) United States Patent
Xiao et al.

(10) Patent No.: US 12,316,656 B2
(45) Date of Patent: *May 27, 2025

(54) DETECTING REPACKAGED APPLICATIONS BASED ON FILE FORMAT FINGERPRINTS

(71) Applicant: Palo Alto Networks, Inc., Santa Clara, CA (US)

(72) Inventors: Zihang Xiao, Santa Clara, CA (US); Zhi Xu, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 594 days.

This patent is subject to a terminal disclaimer.

(21) Appl. No.: 16/543,423

(22) Filed: Aug. 16, 2019

(65) Prior Publication Data
US 2019/0394221 A1    Dec. 26, 2019

Related U.S. Application Data

(63) Continuation of application No. 15/094,954, filed on Apr. 8, 2016, now Pat. No. 10,547,626.
(Continued)

(51) Int. Cl.
*H04L 9/00* (2022.01)
*G06F 16/16* (2019.01)
(Continued)

(52) U.S. Cl.
CPC .......... *H04L 63/1425* (2013.01); *G06F 16/16* (2019.01); *H04M 1/72403* (2021.01)

(58) Field of Classification Search
CPC ............. H04L 63/1425; H04L 63/1416; H04L 63/145; G06F 16/16; H04M 1/72403; H04W 12/128

See application file for complete search history.

(56) References Cited

U.S. PATENT DOCUMENTS 9,792,436 B1 * 10/2017 Sankruthi ............. G06F 21/568
2012/0240236 A1 * 9/2012 Wyatt .................... G06F 21/10
726/25
(Continued)

FOREIGN PATENT DOCUMENTS

CN         104216946 A  * 12/2014  ........... G06F 16/122

OTHER PUBLICATIONS

Zhou W, Zhou Y, Jiang X, Ning P. Detecting repackaged smartphone applications in third-party android marketplaces. InProceedings of the second ACM conference on Data and Application Security and Privacy Feb. 7, 2012 (pp. 317-326). (Year: 2012).*
(Continued)

*Primary Examiner* — Syed M Ahsan
(74) *Attorney, Agent, or Firm* — Van Pelt, Yi & James LLP

(57) ABSTRACT

A set of repackaging fingerprints generated independently of a particular original application is received. The set of repackaging fingerprints comprises a plurality of predetermined indicators of build-related structure that is independent of the particular original application's code structure. A mobile application is received. The received mobile application is analyzed for one or more indicators that the received mobile application is a repackaged version of the particular original application, using at least one repackaging fingerprint. In response to a result of the analysis, the received mobile application is categorized as a repackaged application.

23 Claims, 24 Drawing Sheets

Related U.S. Application Data

(60) Provisional application No. 62/292,858, filed on Feb. 8, 2016.

(51) Int. Cl.
  *H04L 9/40* (2022.01)
  *H04M 1/72403* (2021.01)

(56) References Cited

U.S. PATENT DOCUMENTS

2014/0082729 A1* 3/2014 Shim .................... G06F 21/577
                                                      726/23
2016/0261558 A1* 9/2016 Herrero .................. H04L 65/60

OTHER PUBLICATIONS

Zhou, Wu, et al. "Detecting repackaged smartphone applications in third-party android marketplaces." Proceedings of the second ACM conference on Data and Application Security and Privacy. (Year: 2012).*

Zhou, Wu, et al. "Detecting repackaged smartphone applications in third-party android marketplaces." Proceedings of the second ACM conference on Data and Application Security and Privacy. 2012. (Year: 2012).*

Google Android Developers, "Building and Running", http://developer.android.com/tools/building/index.html, Jul. 23, 2012.

Jiao et al., "A Rapid and Scalable Method for Android Application Repackaging Detection". In: Lopez J., Wu Y. (eds) Information Security Practice and Experience. ISPEC 2015. Lecture Notes in Computer Science, vol. 9065. Springer, Cham. 2015.

Qin et al., "Detecting Repackaged Android Applications". In: Wong W.E., Zhu T. (eds) Computer Engineering and Networking. Lecture Notes in Electrical Engineering, vol. 277. Springer, Cham. 2014.

Shao et al., "Towards a scalable resource-driven approach for detecting repackaged Android applications". In Proceedings of the 30th Annual Computer Security Applications Conference (ACSAC '14). ACM, New York, NY, USA, 56-65. 2014.

Zhang et al., "ViewDroid: towards obfuscation-resilient mobile application repackaging detection". In Proceedings of the 2014 ACM conference on Security and privacy in wireless & mobile networks (WiSec '14). ACM, New York, NY, USA, 25-36.

Zhou et al., "Detecting Repackaged Smartphone Applications in Third-Party Android Marketplaces", CODASPY Feb. 2012. http://www.csc.ncsu.edu/faculty/jiang/pubs/CODASPY12.pdf.

* cited by examiner

.smali
---android
------annotation
---com
------android
---------vending
------------billing
------google
---------ads
---------android
------------gcm
⎫
⎬ 502
⎭

--------h2
--------org
------------springframework
------------util
⎫
⎬ 504
⎭

------jumptap  ⎫ 506
---------adtag ⎭
------greystripe — 508
------burstly — 510
------flurry — 512
------inmobi — 514
------millennialmedia — 516
------ACMEGames — 518
---org
------springframework  ⎫ 520
------codehaus ⎫
---------jackson ⎭ 522
------sneakystuff — 524

FIG. 5

| Name | Value | Start | Size |
|---|---|---|---|
| ▲ struct ZIPFILERECORD record[0] | META-INF/MANIFEST.MF | 0h | 36h |
| ▲ struct ZIPDATADESCR dataDescr[0] | | 5F8h | 10h |
| ▲ struct ZIPFILERECORD record[1] | META-INF/CERT.SF | 608h | 2Eh |
| ▲ struct ZIPDATADESCR dataDescr[1] | | CA1h | 10h |
| ▲ struct ZIPFILERECORD record[2] | META-INF/CERT.RSA | CB1h | 2Fh |
| ▲ struct ZIPDATADESCR dataDescr[2] | | 1162h | 10h |
| ▲ struct ZIPFILERECORD record[3] | AndroidManifest.xml | 1172h | 31h |
| ▲ struct ZIPDATADESCR dataDescr[3] | | 1C00h | 10h |
| ▲ struct ZIPFILERECORD record[4] | classes.dex | 1C10h | 29h |
| ▲ struct ZIPDATADESCR dataDescr[4] | | 65704h | 10h |
| ▲ struct ZIPFILERECORD record[5] | lib/armeabi/liblocSDK3.so | 65714h | 37h |
| ▲ struct ZIPDATADESCR dataDescr[5] | | 6A9FDh | 10h |
| ▲ struct ZIPFILERECORD record[6] | res/drawable-hdpi/browser_icon.png | 6AA0Dh | 34BAh |
| ▲ struct ZIPFILERECORD record[7] | res/drawable-hdpi/coolmart_icon.png | 6DEC7h | 1363h |
| ▲ struct ZIPFILERECORD record[8] | res/drawable-hdpi/dial_icon.png | 6F22Ah | 206Fh |

FIG. 6

| Name | Value |
|---|---|
| ▼ struct header_item dex_header | |
| ▲ struct dex_magic magic | dex 035 |
| uint checksum | 9414A250h |
| ▲ SHA1 signature[20] | 5A8A50B4AF610F29C517FF2BD184041D211AC903 |
| uint file_size | 220628 |
| uint header_size | 112 |
| uint endian_tag | 12345678h |
| uint link_size | 0 |
| uint link_off | 0 |
| uint map_off | 220432 |
| uint string_ids_size | 2187 |
| uint string_ids_off | 112 |
| uint type_ids_size | 522 |
| uint type_ids_off | 8860 |

FIG. 7

| Name | Value |
|---|---|
| ▲ struct header_item dex_header | |
| ▼ struct string_id_list dex_string_ids | 2187 strings |
| ▲ struct string_id_item string_id[0] | |
| ▲ struct string_id_item string_id[1] | |
| ▼ struct string_id_item string_id[2] | |
| uint string_data_off | 170486 |
| ▼ struct string_item string_data | |
| ▲ struct uleb128 utf16_size | 0x2 |
| ▲ string data[3] | |
| ▲ struct string_id_item string_id[3] | |
| ▲ struct string_id_item string_id[4] | |
| ▲ struct string_id_item string_id[5] | |
| ▲ struct string_id_item string_id[6] | # |
| ▲ struct string_id_item string_id[7] | Destroying: |
| ▲ struct string_id_item string_id[8] | Finished Retaining: |
| ▲ struct string_id_item string_id[9] | Op # |

FIG. 8

| Name | Value |
|---|---|
| ▸struct header_item dex_header | |
| ▸struct string_id_list dex_string_ids | 2187 strings |
| ▸struct type_id_list dex_type_ids | 522 types |
| ▸struct proto_id_list dex_proto_ids | 650 prototypes |
| ▸struct field_id_list dex_fiels_ids | 659 fields |
| ▸struct method_id_list dex_method_ids | 2252 methods |
| ▸struct class_def_item_list dex_class_... | 231 classes |
| ▾struct map_list_type dex_map_list | 16 items |
|   uint size | 16 |
|   ▾struct map_item list[16] | |
|     ▸ struct map_item list[0] | TYPE_HEADER_ITEM |
|     ▸ struct map_item list[1] | TYPE_STRING_ID_ITEM |
|     ▸ struct map_item list[2] | TYPE_TYPE_ID_ITEM |
|     ▸ struct map_item list[3] | TYPE_PROTO_ID_ITEM |
|     ▸ struct map_item list[4] | TYPE_FIELD_ID_ITEM |
|     ▸ struct map_item list[5] | TYPE_METHOD_ID_ITEM |
|     ▸ struct map_item list[6] | TYPE_CLASS_DEF_ITEM |
|     ▸ struct map_item list[7] | TYPE_ANNOTATION_SET_ITEM |
|     ▸ struct map_item list[8] | TYPE_CODE_ITEM |
|     ▸ struct map_item list[9] | TYPE_ANNOTATIONS_DIRECTORY_ITEM |
|     ▸ struct map_item list[10] | TYPE_TYPE_LIST |
|     ▸ struct map_item list[11] | TYPE_STRING_DATA_ITEM |
|     ▸ struct map_item list[12] | TYPE_ANNOTATION_ITEM |
|     ▸ struct map_item list[13] | TYPE_ENCODED_ARRAY_ITEM |
|     ▸ struct map_item list[14] | TYPE_CLASS_DATA_ITEM |
|     ▸ struct map_item list[15] | TYPE_MAP_LIST |

| Name | Value |
|---|---|
| ▲ struct header_item dex_header | |
| ▲ struct string_id_list dex_string_ids | 2187 strings |
| ▲ struct type_id_list dex_type_ids | 522 types |
| ▲ struct proto_id_list dex_proto_ids | 650 prototypes |
| ▲ struct field_id_list dex_field_ids | 659 fields |
| ▲ struct method_id_list dex_method_ids | 2252 methods |
| ▲ struct class_def_item_list dex_class_defs | 231 classes |
| ▼ struct map_list_type dex_map_list | 16 items |
|    uint size | 16 |
|    ▼ struct map_item list[16] | |
|      ▲ struct map_item list[0] | TYPE_HEADER_ITEM |
|      ▼ struct map_item list[1]  1002 | TYPE_STRING_ID_ITEM |
|        enum TYPE_CODES type | TYPE_STRING_ID_ITEM (1) ▶ |
|        ushort unused | 0 |
|        uint size | 2187 |
|        uint offset | 112 |
|      ▲ struct map_item list[2] | TYPE_TYPE_ID_ITEM |
|      ▲ struct map_item list[3] | TYPE_PROTO_ID_ITEM |

FIG. 10

| Name | Value |
|---|---|
| ▼struct class_def_item_list dex_class_defs | 231 classes |
| ▶struct class_def_item class_def[0] | public interface abstract com.a.a.c |
| ▶struct class_def_item class_def[1] | public interface abstract com.a.a.b |
| ▶struct class_def_item class_def[2] | public abstract com.a.a.a |
| ▶struct class_def_item class_def[3] | public com.a.a.j |
| ▼struct class_def_item class_def[4] | com.a.a.i |
| uint class_idx | (0x10F) com.a.a.i |
| enum ACCESS_FLAGS access_flags | (0x0) |
| uint superclass_idx | (0x110)com.a.a.j |
| uint interfaces_off | 0 |
| uint source_file_idx | NO_INDEX |
| uint annotations_off | 0 |
| uint class_data_off | 210658 |
| ▼struct class_data_item class_data | 0 static fields, 1 instance fields, 1 dir... |
| ▲struct uleb128 static_fields_size | 0x0 |
| ▲struct uleb128 instance_fields_size | 0x1 |
| ▲struct uleb128 direct_methods_size | 0x1 |
| ▲struct uleb128 virtual_methods_size | 0x1 |
| ▲struct encoded_field_list instance_fields | 1 fields |
| ▼struct encoded_method_list direct_methods | 1 methods |
| ▼struct encoded_method method | constructor void com.a.a.i.<init>(jav... |
| ▲struct uleb128 method_idx_diff | 0x5D9 |
| ▲struct uleb128 access_flags | (0x10000)ACC_CONSTRUCTOR |
| ▲struct uleb128 code_off | 0xC1B8 |
| ▲struct code_item code | 4 registers, 4 in arguments, 3 out arg... |
| ▲struct encoded_method_list virtual_methods | 1 methods |
| uint static_values_off | 0 |
| ▶struct class_def_item class_def[5] | public com.a.a.m |
| ▶struct class_def_item class_def[6] | public com.a.a.f |
| ▶struct class_def_item class_def[7] | public com.a.a.n |

FIG. 11

Labels: 1102, 1104, 1106, 1108, 1110, 1114, 1116, 1118, 1120, 1122, 1112

Signature-Version: 1.0
Created-By: 1.0 (Android SignApk) ⟋ 1202
SHA1-Digest-Manifest: kPDviYp0EaIaLZmxQof0lgdzdDA=

Name: res/drawable-xhdpi/ic_launcher.png
SHA1-Digest: pbixAtsd8RNXqXcVaiiJt/ouXPI=

Name: res/drawable-xhdpi/yl_show_btn_back.png
SHA1-Digest: 7OHm1ZAVmK+0U3x7weHcwg1PzyA=

Name: res/layout/download_main.xml
SHA1-Digest: dEixBTF5VxXbIUMgQmj4HdyjkIk=

Name: res/drawable-xhdpi/downloading.png
SHA1-Digest: 8/gqmosREclK5SDvzLMzNTmfQdA=

Name: res/layout/web_link.xml
SHA1-Digest: fgZbxx4YQGFKxajRlZVhC/lgjLg=

Name: res/drawable-ldpi/trans_icon.png
SHA1-Digest: E2j03I729pwHi5wITHPu2n9OI9I=

Name: res/drawable-mdpi/ota.png
SHA1-Digest: /y6xYV4dlhDeCh9wHG7rN9gxr/U=

FIG. 12

```
○ ⊚ ⊙                    ⌂ CERT.SF - Edited
Signature-Version: 1.0
Created-By: 1.0 (Android)    ─ 1402
SHA1-Digest-Manifest: SfytOUqNnJcdWn7JweTj6gJuNKQ=

Name: res/layout/activity_settings.xml
SHA1-Digest: mQNRGu/fDuIF5DkzN531jIt2Mco=

Name: assets/user_manual_files/themedata.thmx
SHA1-Digest: AYVX+0g7BvlYpBPdPq4j8SovYk0=

Name: res/drawable-mdpi/abc_menu_hardkey_panel_holo_dark.9.png
SHA1-Digest: TpcPD4GNpnJcrGwWzE+ZPdGst+U=
```

FIG. 14A

```
○ ⊚ ⊙                    ⌂ CERT.SF - Edited
Signature-Version: 1.0
Created-By: 1.0 (Android SignApk)    ─ 1404
SHA1-Digest-Manifest: kPDviYp0EaIaLZmxQof0lgdzdDA=

Name: res/drawable-xhdpi/ic_launcher.png
SHA1-Digest: pbixAtsd8RNXqXcVaiiJt/ouXPI=

Name: res/drawable-xhdpi/yl_show_btn_back.png
SHA1-Digest: 7OHm1ZAVmK+0U3x7weHcwg1PzyA=

Name: res/layout/download_main.xml
SHA1-Digest: dEixBTF5VxXbIUMgQmj4Hdyjklk=
```

FIG. 14B

| Name | Value |
|---|---|
| ▼ struct string_id_list dex_string_ids | 51 strings |
| ▼ struct string_id_item string_id[0] | <init> |
| uint string_data_off | 1330 |
| ▶ struct string_item string_data | |
| ▼ struct string_id_item string_id[1] | I |
| uint string_data_off | 1338 |
| ▶ struct string_item string_data | |
| ▼ struct string_id_item string_id[2] | L |
| uint string_data_off | 1341 |
| ▶ struct string_item string_data | |
| ▼ struct string_id_item string_id[3] | LI |
| uint string_data_off | 1344 |
| ▶ struct string_item string_data | |
| ▼ struct string_id_item string_id[4] | Landroid/app/Activity: |
| uint string_data_off | 1348 |
| ▶ struct string_item string_data | |
| ▼ struct string_id_item string_id[5] | Landroid/os/Bundle: |
| uint string_data_off | 1372 |
| ▶ struct string_item string_data | |

FIG. 15A

| Name | Value |
|---|---|
| ▼struct string_id_list dex_string_ids | 3962 strings |
| ▼struct string_id_item string_id[0] | |
| uint string_data_off | 184498 |
| ▸struct string_item string_data | |
| ▼struct string_id_item string_id[1] | |
| uint string_data_off | 199102 |
| ▸struct string_item string_data | |
| ▼struct string_id_item string_id[2] | |
| uint string_data_off | 184634 |
| ▸struct string_item string_data | |
| ▼struct string_id_item string_id[3] | All views in script should be declared. |
| uint string_data_off | 200430 |
| ▸struct string_item string_data | |
| ▼struct string_id_item string_id[4] | Continue? |
| uint string_data_off | 186261 |
| ▸struct string_item string_data | |
| ▼struct string_id_item string_id[5] | Did you forget to call Activity.LoadL... |
| uint string_data_off | 178379 |
| ▸struct string_item string_data | |

FIG. 15B

| ▼ struct map_list_type dex_map_list | 17 items |
|---|---|
| uint size | 17 |
| ▼ struct map_item list[17] | |
| ▸ struct map_item list[0] | TYPE_HEADER_ITEM |
| ▸ struct map_item list[1] | TYPE_STRING_ID_ITEM |
| ▸ struct map_item list[2] | TYPE_TYPE_ID_ITEM |
| ▸ struct map_item list[3] | TYPE_PROTO_ID_ITEM |
| ▸ struct map_item list[4] | TYPE_FIELD_ID_ITEM |
| ▸ struct map_item list[5] | TYPE_METHOD_ID_ITEM |
| ▸ struct map_item list[6] | TYPE_CLASS_DEF_ITEM |
| ▸ struct map_item list[7] | TYPE_ANNOTATION_SET_ITEM |
| ▸ struct map_item list[8] | TYPE_CODE_ITEM |
| ▸ struct map_item list[9] | TYPE_ANNOTATIONS_DIRECTORY_ITEM |
| ▸ struct map_item list[10] | TYPE_TYPE_LIST |
| ▸ struct map_item list[11] | TYPE_STRING_DATA_ITEM |
| ▸ struct map_item list[12] | TYPE_ANNOTATION_ITEM |
| ▸ struct map_item list[13] | TYPE_ENCODED_ARRAY_ITEM |
| ▸ struct map_item list[14] | TYPE_CLASS_DATA_ITEM |
| ▸ struct map_item list[15] | TYPE_DEBUG_INFO_ITEM |
| ▸ struct map_item list[16] | TYPE_MAP_LIST |

FIG. 16A

| ▼ struct map_list_type dex_map_list | 17 items |
|---|---|
| uint size | 17 |
| ▼ struct map_item list[17] | |
| ▸ struct map_item list[0] | TYPE_HEADER_ITEM |
| ▸ struct map_item list[1] | TYPE_STRING_ID_ITEM |
| ▸ struct map_item list[2] | TYPE_TYPE_ID_ITEM |
| ▸ struct map_item list[3] | TYPE_PROTO_ID_ITEM |
| ▸ struct map_item list[4] | TYPE_FIELD_ID_ITEM |
| ▸ struct map_item list[5] | TYPE_METHOD_ID_ITEM |
| ▸ struct map_item list[6] | TYPE_CLASS_DEF_ITEM |
| ▸ struct map_item list[7] | TYPE_ANNOTATION_SET_ITEM |
| ▸ struct map_item list[8] | TYPE_CODE_ITEM |
| ▸ struct map_item list[9] | TYPE_ANNOTATIONS_DIRECTORY_ITEM |
| ▸ struct map_item list[10] | TYPE_TYPE_LIST |
| ▸ struct map_item list[11] | TYPE_STRING_DATA_ITEM |
| ▸ struct map_item list[12] | TYPE_DEBUG_INFO_ITEM |
| ▸ struct map_item list[13] | TYPE_ANNOTATION_ITEM |
| ▸ struct map_item list[14] | TYPE_ENCODED_ARRAY_ITEM |
| ▸ struct map_item list[15] | TYPE_CLASS_DATA_ITEM |
| ▸ struct map_item list[16] | TYPE_MAP_LIST |

FIG. 16B

| ▼ struct map_list_type dex_map_list | 17 items |
|---|---|
| uint size | 17 |
| ▼ struct map_item list[17] | |
| ▶ struct map_item list[0] | TYPE_HEADER_ITEM |
| ▶ struct map_item list[1] | TYPE_STRING_ID_ITEM |
| ▶ struct map_item list[2] | TYPE_TYPE_ID_ITEM |
| ▶ struct map_item list[3] | TYPE_PROTO_ID_ITEM |
| ▶ struct map_item list[4] | TYPE_FIELD_ID_ITEM |
| ▶ struct map_item list[5] | TYPE_METHOD_ID_ITEM |
| ▶ struct map_item list[6] | TYPE_CLASS_DEF_ITEM |
| ▶ struct map_item list[7] | TYPE_ANNOTATION_SET_ITEM |
| ▶ struct map_item list[8] | TYPE_CODE_ITEM |
| ▶ struct map_item list[9] | TYPE_ANNOTATIONS_DIRECTORY_ITEM |
| ▶ struct map_item list[10] | TYPE_TYPE_LIST |
| ▶ struct map_item list[11] | TYPE_STRING_DATA_ITEM |
| ▶ struct map_item list[12] | TYPE_DEBUG_INFO_ITEM |
| ▶ struct map_item list[13] | TYPE_ANNOTATION_ITEM |
| ▶ struct map_item list[14] | TYPE_ENCODED_ARRAY_ITEM |
| ▶ struct map_item list[15] | TYPE_CLASS_DATA_ITEM |
| ▶ struct map_item list[16] | TYPE_MAP_LIST |

FIG. 17A

| ▼ struct map_list_type dex_map_list | 16 items |
|---|---|
| uint size | 16 |
| ▼ struct map_item list[16] | |
| ▶ struct map_item list[0] | TYPE_HEADER_ITEM |
| ▶ struct map_item list[1] | TYPE_STRING_ID_ITEM |
| ▶ struct map_item list[2] | TYPE_TYPE_ID_ITEM |
| ▶ struct map_item list[3] | TYPE_PROTO_ID_ITEM |
| ▶ struct map_item list[4] | TYPE_FIELD_ID_ITEM |
| ▶ struct map_item list[5] | TYPE_METHOD_ID_ITEM |
| ▶ struct map_item list[6] | TYPE_CLASS_DEF_ITEM |
| ▶ struct map_item list[7] | TYPE_STRING_DATA_ITEM |
| ▶ struct map_item list[8] | TYPE_TYPE_LIST |
| ▶ struct map_item list[9] | TYPE_ANNOTATION_ITEM |
| ▶ struct map_item list[10] | TYPE_ANNOTATION_SET_ITEM |
| ▶ struct map_item list[11] | TYPE_ANNOTATIONS_DIRECTORY_ITEM |
| ▶ struct map_item list[12] | TYPE_DEBUG_INFO_ITEM |
| ▶ struct map_item list[13] | TYPE_CODE_ITEM |
| ▶ struct map_item list[14] | TYPE_CLASS_DATA_ITEM |
| ▶ struct map_item list[15] | TYPE_MAP_LIST |

FIG. 17B

| Name | Value |
|---|---|
| ▼ struct header_item dex_header | |
| ▶ struct dex_magic magic | dex 035 |
| uint checksum | 34BDF78Ch |
| ▶ SHA1 signature[20] | 1C333CF870C3710DFC030D4292A2... |
| uint file_size | 18416 |
| uint header_size | 112 |
| uint endian_tag | 12345678h |
| uint link_size | 0 |
| uint link_off | 0 |
| uint map_off | 18220 |

FIG. 18A

| Name | Value |
|---|---|
| ▼ struct header_item dex_header | |
| ▶ struct dex_magic magic | dex 035 |
| uint checksum | 34BDF78Ch |
| ▶ SHA1 signature[20] | 1C333CF870C3710DFC030D4292A2... |
| uint file_size | 4278208496 |
| uint header_size | 368 |
| uint endian_tag | 12345678h |
| uint link_size | 0 |
| uint link_off | 0 |
| uint map_off | 18220 |

FIG. 18B

| Name | Value |
|---|---|
| ▶ struct header_item dex_header | |
| ▲ struct dex_magic magic | dex 035 |
| uint checksum | 34BDF78Ch |
| ▲ SHA1 signature[20] | 1C333CF870C3710DFC030D4292A25194DDD605AF |
| uint file_size | 18416 |
| uint header_size | 112 |
| uint endian_tag | 12345678h |
| uint link_size | 0 |
| uint link_off | 0 |
| uint map_off | 18220 |

FIG. 19A

| Name | Value |
|---|---|
| ▶ struct header_item dex_header | |
| ▲ struct dex_magic magic | dex 035 |
| uint checksum | 34BDF78Ch |
| ▲ SHA1 signature[20] | 0000000000000000000000000000000000000000 |
| uint file_size | 18416 |
| uint header_size | 112 |
| uint endian_tag | 12345678h |
| uint link_size | 0 |
| uint link_off | 0 |
| uint map_off | 18220 |

FIG. 19B

| | |
|---|---|
| ▼ struct class_def_item class_def[6] | public tesla.mit.Tesla2012Activity |
| uint class_idx | (0×11) tesla.mit.Tesla2012Activity |
| enum ACCESS_FLAGS access_flags | (0×1) ACC_PUBLIC |
| uint superclass_idx | (0×1) android.app.Activity |
| uint interfaces_off | 0 |
| uint source_file_idx | (0×16) "Tesla2012Activity.java" |
| uint annotations_off | 0 |
| uint class_data_off | 2279 |
| ▼ struct class_data_item class_data | 0 static fields, 1 instance fields, 1 direct methods, 0 v... |
| ▶ struct uleb128 static_fields_... | 0×0 |
| ▶ struct uleb128 instance_field... | 0×1 |
| ▶ struct uleb128 direct_metho... | 0×1 |
| ▶ struct uleb128 virtual_metho... | 0×1 |
| ▶ struct encoded_field_list inst... | 1 fields |
| ▼ struct encoded_method_list... | 1 methods |
| ▼ struct encoded_method m... | public constructor void tesla.mit.Tesla2012Activity.<i... |
| ▶ struct uleb128 method_... | 0×C |
| ▶ struct uleb128 access_f... | (0×10001) ACC_PUBLIC ACC_CONSTRUCTOR |
| ▶ struct uleb128 code_off | 0×444 |
| ▶ struct code_item code | 1 registers, 1 in arguments, 1 out arguments, 0 tries,... |

FIG. 20A

| | |
|---|---|
| ▼ struct class_def_item class_def[6] | public tesla.mit.Tesla2012Activity |
| uint class_idx | (0×11) tesla.mit.Tesla2012Activity |
| enum ACCESS_FLAGS access_flags | (0×1) ACC_PUBLIC |
| uint superclass_idx | (0×1) android.app.Activity |
| uint interfaces_off | 0 |
| uint source_file_idx | (0×16) "Tesla2012Activity.java" |
| uint annotations_off | 0 |
| uint class_data_off | 2279 |
| ▼ struct class_data_item class_data | 0 static fields, 0 instance fields, 0 direct methods, 0 v... |
| ▶ struct uleb128 static_fields_... | 0×0 |
| ▶ struct uleb128 instance_field... | 0×0 |
| ▶ struct uleb128 direct_metho... | 0×0 |
| ▶ struct uleb128 virtual_metho... | 0×0 |
| uint static_values_off | 0 |

FIG. 20B

DETECTING REPACKAGED APPLICATIONS BASED ON FILE FORMAT FINGERPRINTS

CROSS REFERENCE TO OTHER APPLICATIONS

This application is a continuation of U.S. patent application Ser. No. 15/094,954, entitled DETECTING REPACKAGED APPLICATIONS BASED ON FILE FORMAT FINGERPRINTS filed Apr. 8, 2016, which claims priority to U.S. Provisional Patent Application No. 62/292,858, entitled DETECTING REPACKAGED APPLICATION BASED ON FILE FORMAT FINGERPRINTS filed Feb. 8, 2016, both of which are incorporated herein by reference for all purposes.

BACKGROUND OF THE INVENTION

Individuals are increasingly spending more time using mobile devices and less time using traditional computers. This shift in usage is present both in personal and in business contexts. For example, employees of companies are increasingly using mobile devices for their work related activities. In conjunction with this shift in user behavior, nefarious individuals and organizations are increasingly targeting mobile devices with malicious applications ("malware"). Unfortunately, it can be difficult to protect mobile devices using existing techniques.

BRIEF DESCRIPTION OF THE DRAWINGS

Various embodiments of the invention are disclosed in the following detailed description and the accompanying drawings.

FIG. 5 illustrates an example representation of .smali information.

FIG. 6 illustrates a representation of contents of an Android APK file.

FIG. 7 illustrates an example of a header of a DEX file.

FIG. 8 illustrates an example of a string list in a DEX file.

FIG. 9 illustrates an example of a map list in a DEX file.

FIG. 10 illustrates an example of a map list in a DEX file.

FIG. 11 illustrates an example of a class definition table.

FIG. 12 illustrates an example of a CERT.SF file.

FIG. 14A illustrates an example of a CERT.SF file of an original APK file.

FIG. 14B illustrates an example of a CERT.SF file of a repackaged APK file.

FIG. 15A illustrates an example of a portion of an original APK's string table.

FIG. 15B illustrates an example of a portion of a repackaged APK's string table.

FIG. 16A illustrates an example of a portion of an original APK's map table.

FIG. 16B illustrates an example of a portion of a repackaged APK's map table.

FIG. 17A illustrates an example of a portion of an original APK's map table.

FIG. 17B illustrates an example of a portion of a repackaged APK's map table.

FIG. 18A represents a portion of a DEX file from an original APK.

FIG. 18B represents a portion of a DEX file from a repackaged APK.

FIG. 19A represents a portion of a DEX file from an original APK.

FIG. 19B represents a portion of a DEX file from a repackaged APK.

FIG. 20A represents a portion of an original APK file.

FIG. 20B represents a portion of a repackaged APK file.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
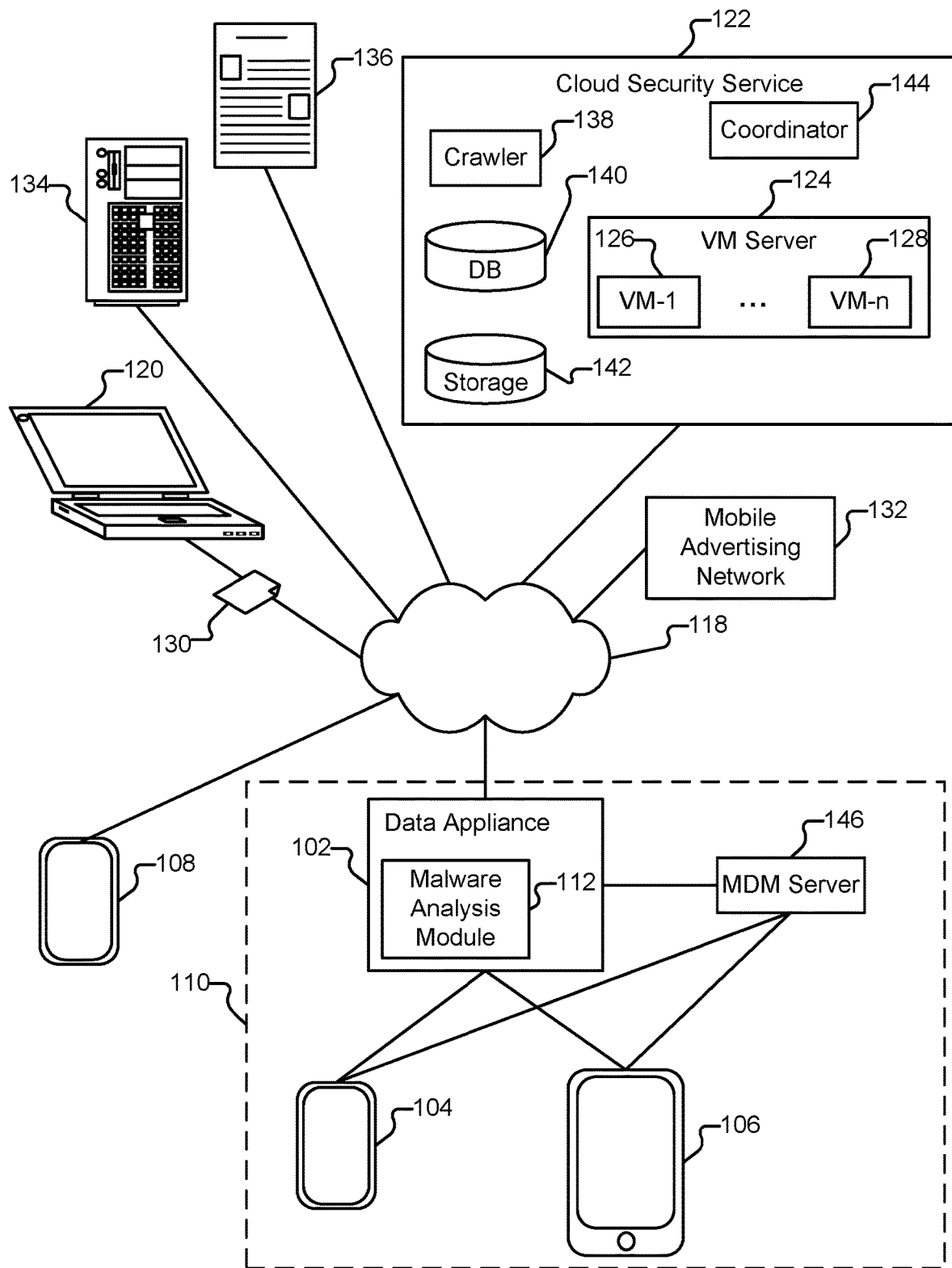
FIG. 1 illustrates an example of an environment in which mobile malware is detected and prevented from causing harm.

FIG. 1 illustrates an example of an environment in which malicious mobile applications ("malware") are detected and prevented from causing harm. Applications of other types (e.g., adware) can also be classified using embodiments of the environment shown in FIG. 1. As will be described in more detail below, components of applications (e.g., resource files/libraries used in conjunction with authoring the applications) can be evaluated using techniques described herein, and mobile applications can be classified based on their components and/or actions attributable to those included components. As one example, and as will be described in more detail below, repackaged applications can be distinguished from original applications using techniques described herein.

The term "application" is used throughout the Specification to collectively refer to programs, bundles of programs, manifests, packages, etc., irrespective of form/platform. As used herein, an "original" application is one built from source or other code (e.g., Java/C/C++), typically by an author, developer, maintainer, or other entity with access to the applicable code, and typically signed by such an individual/entity. In contrast, a "repackaged" application is one built (e.g., by repackaging tools) from an existing application, such as by obtaining an existing application, disassembling that application, modifying it, and reassembling it.

"Malware" as used herein refers to an "application" that engages in behaviors, whether clandestinely or not, of which a user does not approve/would not approve if fully informed (whether illegal or not). Examples of malware include Trojan, viruses, rootkits, spyware, adware, hacking tools, keyloggers, personal information collectors, etc. One particular example of mobile malware is a malicious Android Application Package .apk (APK) file that appears to an end user to be a free game, but stealthily sends SMS premium messages (e.g., costing $10 each), running up the end user's phone bill. Another example of mobile malware is a flashlight application that stealthily collects the user's contacts and sends them to a spammer. Yet another example of mobile malware is an application that collects and reports to a remote server the end user's location (but does not offer a location-based service to the user, such as a mapping service).

Other forms of mobile malware can also be detected/thwarted using the techniques described herein. And, the techniques described herein can be used to classify a variety of types of mobile applications (in addition to or instead of classifying malware). As one example, "repackaging" is an approach used in a variety of attacks, where malicious code is injected into existing APK (or other application) files, building cracked or pirated APK files. In repackaging, the attacker first reverses a target APK file (also referred to herein as an "original" application) to intermediate code (e.g., in the .smali syntax), modifies the code, and then builds a new APK file based on the modified code. Some applications are repackaged to introduce malicious elements (e.g., a legitimate flashlight application is repackaged by a nefarious individual to include a Trojan, adware, spyware, etc.). Other reasons for repackaging applications also exist. As one example, a paid application (e.g., one costing an end user $3 in an app store) might be repackaged by a third party and sold for a lower price (e.g., one costing the end user $1 in the app store) with the underlying functionality of the paid applicable unchanged. As will be described in more detail below, techniques described herein can be used to detect such repackaged applications. As a repackaged file is not the original version of an application, the integrity of the original APK file may have been compromised during repackaging. Accordingly, knowing whether or not an APK file has been repackaged is important information, irrespective of whether the repackaged APK is in fact malicious.

Suppose a nefarious individual wishes to propagate mobile malware (such as malware 130) via system 120 to end users. A variety of approaches can be used by the nefarious individual. As one example, the individual can upload mobile malware 130 to a software distribution platform such as platform 134 (also referred to as an "an app store"). The nefarious individual hopes that unsuspecting users of platform 134 (e.g., any of applicable client devices 104-108) will download the malicious application 130 from platform 134 and install it on their devices. Example embodiments of platform 134 include Google Play, the iOS App Store, BlackBerry World, the Windows Phone Store, and the Amazon Appstore. Additional examples of software distribution platforms include third party software distribution platforms, such as the Baidu App Store, GetJar, and Handango. Another way the nefarious individual can attempt to propagate mobile malware is by posting it on a message/forum site, such as site 136. In this scenario, the nefarious individual again hopes that unsuspecting users of site 136 will download and install the malicious application 130. Yet another way for the nefarious individual to attempt to propagate mobile malware 130 is to attach it to an email message and hope that the recipient (e.g., the owner of device 104) will open the attachment and install the program. Yet another way for the nefarious individual to attempt to propagate mobile malware 130 is to include it in an advertising company's ad network (e.g., mobile ad network 132) and hope that the user will install the promoted program. Yet another way for the nefarious individual to attempt to propagate mobile malware 130 is to include a download link for the malware within phishing SMS messages and hope the recipient (e.g., the owner of device 104) will download the malware and install the program. Yet another way for the nefarious individual to attempt to propagate mobile malware 130 is to use another piece of malware that is already installed on device 104 and let the already installed malware install the new malware 130 on device 104.

In the example shown in FIG. 1, client devices 104-106 are a smartphone and a tablet (respectively) present in an enterprise network 110. Client device 108 is outside enterprise network 110. As shown, client device 104 runs an Android-based operating system and client device 106 runs a version of iOS. Client device 108 is a smartphone that runs Windows Mobile OS. Each of the devices shown can be protected using techniques described herein. Other devices running other mobile operating systems can also be protected using the techniques described herein.

Data appliance 102 is configured to enforce policies regarding communications between clients such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110. In some embodiments, other devices are included in network 110, such as a mobile device management (MDM) server 146, which is in communication with data appliance 102. As shown, MDM server 146 communicates with mobile devices (e.g., 104, 106) to determine device status and to report (e.g., periodically) such mobile device status information to data appliance 102. MDM server 146 can be configured to report the presence of malicious applications installed on devices such as device 104/106, and/or can be configured to receive indications of which mobile applications are malicious (e.g., from appliance 102, from service 122, or combinations thereof). In some embodiments, data appliance 102 is configured to enforce polices against devices 104 and 106 based on information received from MDM server 146. For example, if device 106 is determined to have malware installed on it (or other unapproved types of applications), data appliance 102 (working in cooperation with MDM server 146) can deny device 106 access to certain enterprise resources (e.g., an Intranet) while allowing device 104 (which does not have malware installed upon it) access to the resources.

Figure 2:
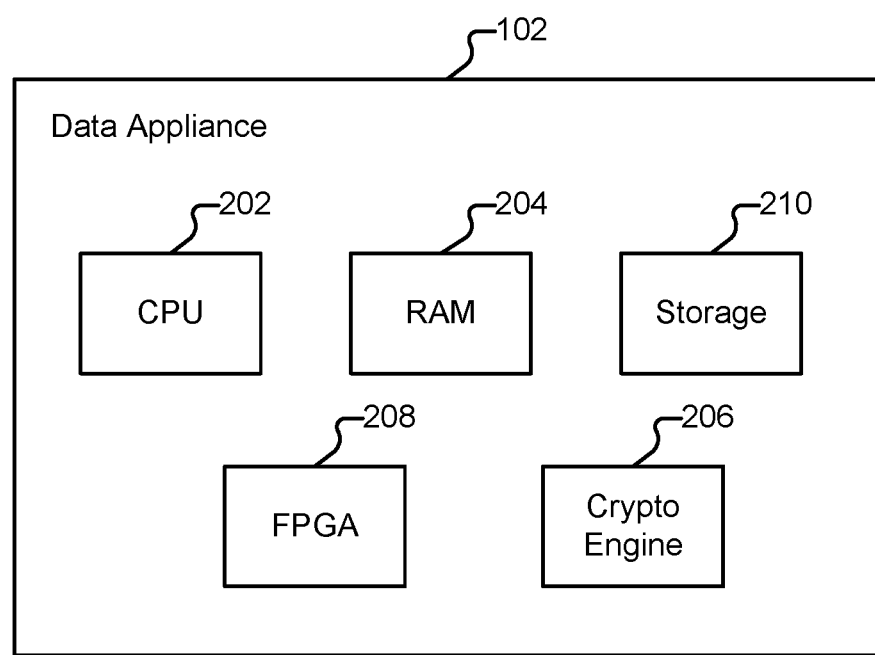
FIG. 2 illustrates an embodiment of a data appliance.

An embodiment of a data appliance is shown in FIG. 2. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a single, dedicated device (e.g., as shown), and can also be a set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 (or client 106) by an agent or other software executing at least partially on client 104 (or client 106).

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

Suppose data appliance 102 intercepts an email sent by system 120 to device 104 to which a copy of malware 130 has been attached. As an alternate, but similar scenario, data appliance 102 could intercept an attempted download by device 104 of malware 130 from platform 134 or site 136. Data appliance 102 determines whether a signature for the attachment (i.e., malware 130) is present on data appliance 102. A signature, if present, can indicate that the attachment is known to be safe, and can also indicate that the attachment is known to be malicious. If no signature for the attachment is found, in some embodiments, data appliance 102 is configured to provide the attachment (malware 130) to a mobile malware analysis module 112 for real-time analysis. As will be described in more detail below, a combination of static and dynamic analysis can be performed on the application to determine whether it is malicious, and/or to otherwise classify it. As will further be described in more detail below, the static and dynamic analysis can be performed taking into account the various types of components used to author the application.

As mentioned above, the analysis of malware 130 can be performed on premise. For example, the analysis can be performed by a malware analysis module 112 included in data appliance 102. Instead of or in addition to on-premise analysis, appliance 102 can also send a copy of malware 130 to cloud security service 122 for analysis. Further, cloud security service 122 can also (or instead) obtain copies of mobile applications for evaluation from sources other than data appliance 102. As one example, cloud security service 122 can include a crawler 138 configured to periodically crawl platform 134 and/or site 136, looking for new or updated applications. Such applications (an example of which is malware 130) can then be analyzed by cloud security service 122. In some embodiments, platform 134 and/or site 136 makes copies of applications available to cloud security service 122 via an Application Programming Interface (API) made available by service 122, instead of or in addition to crawler 138 obtaining such copies. Further, in various embodiments, cloud security service 122 and/or malware analysis module 112 are incorporated into platform 134 and/or site 136.

Copies of received applications (i.e., awaiting analysis) are stored in storage 142 and analysis is commenced (or scheduled, as applicable). As will be described in more detail below, results of the analysis (and additional information pertaining to the applications) are stored in database 140, as is, in some embodiments, information pertaining to components incorporated into various applications.

Cloud security service 122 can comprise one or more dedicated commercially available hardware servers (e.g., having multi-core processor(s), 8G+ of RAM, gigabit network interface adaptor(s), and hard drive(s)) running typical server-class operating systems (e.g., Linux). In various embodiments, service 122 is implemented across a scalable infrastructure comprising multiple such servers, solid state drives, and/or other applicable high-performance hardware. Cloud security service 122 can comprise several distributed components, including components provided by one or more third parties. For example, portions or all of cloud security service 122 can be implemented using the Amazon Elastic Compute Cloud (EC2) and/or Amazon Simple Storage Service (S3). Further, as with data appliance 102, when cloud security service 122 is referred to as performing a task, such as storing data or processing data, it is to be understood that a sub-component or multiple sub-components of cloud security service 122 (whether individually or in cooperation with third party components) may cooperate to perform that task. As one example, cloud security service 122 can optionally perform its analysis in cooperation with one or more virtual machine (VM) servers, such as VM server 124.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers cloud security service 122, but may also be provided by a third party. As one example, the virtual machine server can rely on EC2, with the remainder portions of cloud security service 122 provided by dedicated hardware owned by and under the control of the operator of cloud security service 122. As will be explained in more detail below, virtual machine server 124 is configured to provide one or more virtual machines 126-128 for emulating mobile devices. The virtual machines can execute a variety of operating systems and/or versions thereof. Observed behaviors resulting from executing mobile applications in the virtual machines are logged and analyzed (e.g., for indications that the application is malicious). In some embodiments the log analysis is performed by the VM server (e.g., VM server 124). In other embodiments, the analysis is performed at least in part by other components of service 122, such as coordinator 144.

In some embodiments, cloud security service 122 makes available the results of its analysis of mobile applications via a list of signatures (and/or other identifiers) to appliance 102 (and/or to MDM server 146) as part of a subscription. For example, service 122 can send a content package that identifies malware apps periodically (e.g., daily, hourly, or some other interval, and/or based on an event based on a policy). An example content package includes a listing of identified malware apps (e.g., information in the content package can include an app package name, an app hash code for uniquely identifying the app, and a malware name for each identified malware app). The subscription can cover the analysis of just those files intercepted by data appliance 102 and sent to cloud security service 122 by data appliance 102, and can also cover signatures of all malware known to cloud security service 122 (or subsets thereof, such as just mobile malware but not other forms of malware (e.g., PDF malware)). Further, in some embodiments, cloud security service 122 is configured to provide security services to entities in addition to or instead of an operator of data appliance 102. For example, a carrier providing cellular service to device 108 can contract with cloud security service 122 to analyze applications which device 108 attempts to download. As another example, the owner of device 108 can contract with cloud security service 122 to analyze applications. As yet another example, an operator of app store 134, and/or an operator of site 136 can contract with cloud security service 122 to analyze mobile applications (e.g., for a fee).

In the event malware 130 is determined to be malicious (whether by cloud security service 122 or by data appliance 102), appliance 102 can be configured to automatically block the file download based on the analysis result. Further, a signature can be generated for malware 130 and distributed (e.g., to other data appliances) to automatically block future file transfer requests to download the file determined to be malicious.

Analyzing Mobile Applications

Overview

Figure 3:
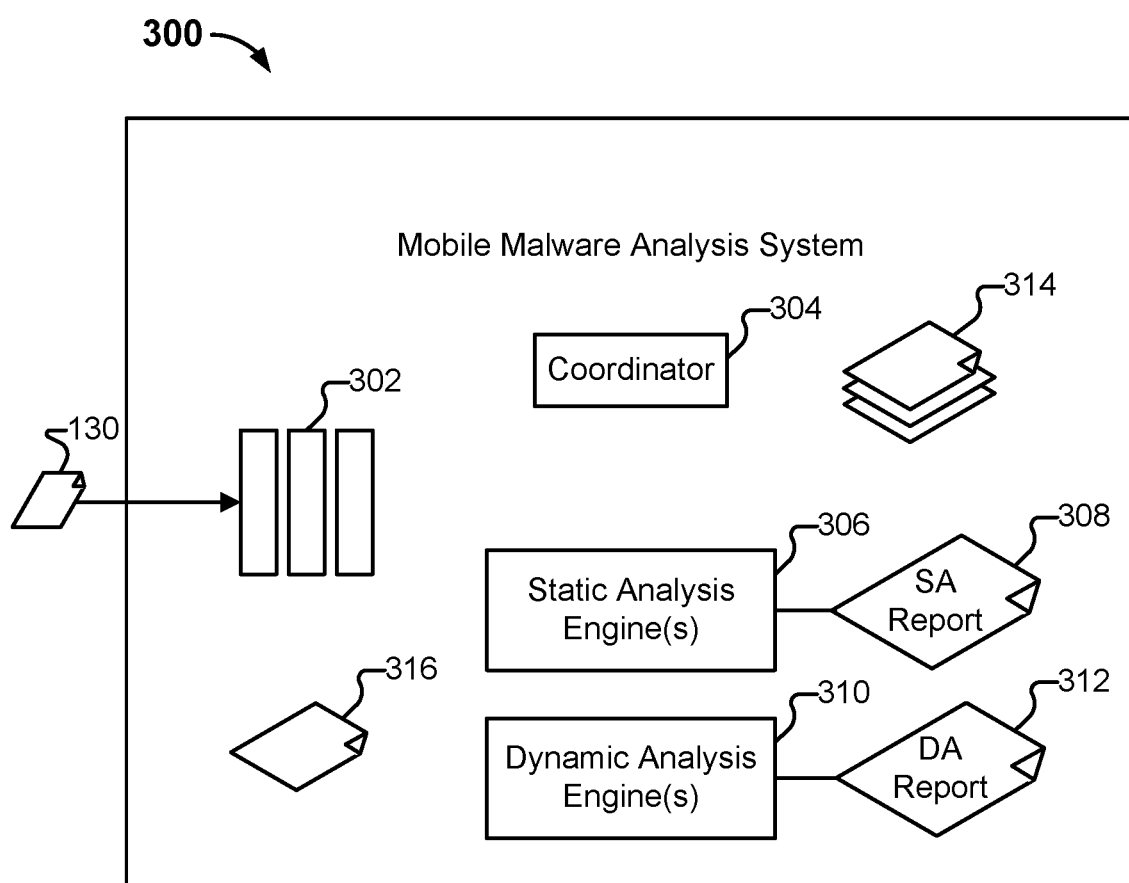
FIG. 3 illustrates an example of logical components included in a system for performing static and dynamic analysis on a mobile device application.

FIG. 3 illustrates an example of logical components included in a system for performing static and dynamic analysis on a mobile device application. As explained above, system 300 can be implemented using a single device. For example, the functionality of system 300 can be implemented on data appliance 102 which includes an analysis module 112. System 300 can also be implemented, collectively, across multiple distinct devices. For example, the functionality of system 300 can be provided by cloud security service 122.

As will be described in more detail below, system 300 is configured to perform a two part analysis on mobile device applications, including by performing static and dynamic analysis. The two-phase approach helps improve the accuracy of mobile malware detection, while lowering the false positive rate of mislabeling benign application files as malware (e.g., due to harmless but poor programming techniques on the part of the application's author; or by including a common third party library, such as a legitimate advertising library, that requires permissions not otherwise used by the application).

During the static analysis portion of the analysis, the application (also referred to herein as a "host application" or "host APK") is reversed into a "reversed host application" (also referred to herein as a "reversed host APK"). The reversed host application is (in some embodiments) a directory structure (e.g., including one or more subdirectories) of source (and/or intermediate) code and resource files reversed from a given host application. As will be described in more detail below, during static analysis, the structure of the APK file is examined (e.g., by reading the META-INF/CERT.SF) and parsing the DEX file format for classes.dex is performed. A variety of fingerprints, described in more detail below, can be used to determine whether the APK file is repackaged or original.

In some embodiments, the code is aggregated into libraries based on the developers of and/or functionality provided by the code. The libraries can be grouped (e.g., based on whether a given library or code is provided by the developer, a commonly used third party library, or unrecognized). As one example, a mobile game application will typically include code written by the game's developer (e.g., providing the logic of how the game operates), as well as third party code. Examples of such third party code include an animation library to assist in rendering graphics, an advertising library that allows users of the game to play for free in exchange for viewing advertisements (with the game developer receiving a cut of the advertising revenue), and a payment system library to collect "in-app" payments from users. Other examples of third party code/libraries include those that provide accessorial functionalities such as mobile advertisement, usage statistics, encryption/coding, and social networking. The third party code typically is not directly related to the host application and in some cases may run autonomously from the host application after installation. As will be described in more detail below, at least some of these libraries might be very common (e.g., many applications available from platform 134 might incorporate the same third party advertising library). Any such commonly used libraries (e.g., provided by well known vendors) incorporated into an application are included in what is referred to herein as the "common" group. Analysis of a given application can be made more efficient by focusing the analysis on those portions of an application that are not common across large numbers of applications (i.e., the portions not belonging to the "common" group). An application's components which are not included in the "common" group are referred to herein as belonging to the "uncommon" group of code/libraries. The "uncommon" group can further be subdivided into the "core group" (i.e., code/libraries which are developed by the host application developer for the main functionality of the host application) and into the "unrecognized group" (i.e., third party code that is not well-known, code with a malicious payload added, repackaged malicious code, etc.).

During the dynamic portion of the analysis, behaviors performed by the application are analyzed (e.g., to check whether the application uses its capabilities suspiciously/maliciously). As will be described in more detail below, heuristics can be used in conjunction with dynamic analysis to determine whether a particular behavior, when executed by a particular library, should be considered malicious.

A final verdict pertinent to the application can be made based on both the application's content (e.g., where the application includes a URL verified to be a malicious website) and on the context in which it behaves (e.g., whether the usage of a suspicious capability is made aware to an end user or is performed silently in the background). As mentioned above, the application can also be classified without a maliciousness verdict being made. For example, an embodiment of system 300 can be configured to classify applications as original or repackaged, without regard to whether or not the applications are in fact malicious.

In various embodiments, system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or service 122). Examples of information included in collection 314 are: URLs of known malicious websites; URLs of known safe websites; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries. As will be described in more detail below, collections of known original applications and known repackaged applications can be used to generate fingerprints indicative of repackaging.

Ingestion

In various embodiments, when a new mobile application is received for analysis (e.g., an existing signature associated with the mobile application is not present in system 300), it is added to processing queue 302. In the following example, suppose the application is called "game.apk," (the malicious game 130) but that it is not yet known whether or not the game is malicious. The Android application package "game.apk" is an example of a "host APK."

As explained above, a mobile application for analysis can be received in a variety of ways. As one example, a mobile application can be received by data appliance 102 for analysis when data appliance 102 intercepts an email or other data transmission intended for device 104 that includes the application. Additional examples of the receipt of a mobile application include: (1) receipt by service 122 of the application from data appliance 102, platform 134, or site 136 for analysis (e.g., via an API), and (2) crawling by service 122 of systems such as platform 134 or site 136.

Static Analysis

Coordinator 304 monitors the queue, and as resources (e.g., a static analysis worker) become available, coordinator 304 fetches an application from queue 302 for processing (e.g., fetches game.apk). In particular, coordinator 304 first provides the application to static analysis engine 306 for static analysis. In some embodiments, one or more static analysis engines are included within system 300, where system 300 is a single device. In other embodiments, static analysis is performed by a separate static analysis server that includes a plurality of workers (i.e., a plurality of instances of static analysis engine 306).

The static analysis engine obtains general information about the application, and includes it (along with heuristic and other information described below) in a static analysis report 308. The report can be created by the static analysis engine, or by coordinator 304 (or by another appropriate component) which can be configured to receive the information from static analysis engine 306. In some embodiments, the collected information is stored in a database record for the application (e.g., in database 140), instead of or in addition to a separate report 308 being created (i.e., portions of the database record form the report 308). Examples of collected information include: the package name, shared UID, APK file signer information, permissions claimed, and sensitive API calls included in the source (e.g., sending or erasing SMS messages, accessing the phonebook, and tracking user location changes). The static analysis engine also collects and stores information pertaining to the running context of the application, such as: the minimum version of the Android OS required to run the application (the minimum SDK version), and the sensors it will have access to. As will be described in more detail below, the static analysis engine can evaluate the components of the application and include that information in the report as well.

One example of how static analysis can be performed, using game.apk (an Android application) as an example is as follows, and described in conjunction with the process shown in FIG. 4. Similar approaches can be used for mobile applications on other platforms (e.g., iOS applications or Windows Mobile applications). First (at 402), static analysis engine 306 uses a tool, such as Android Apktool, to reverse game.apk into an intermediate source code form. The output of the reversing operation is, in some embodiments, a set of .smali files—the direct output of the disassembly from Dalvik virtual machine language, and other resource files included in the game.apk file.

An example representation of .smali information of a game made by a fictional company called ACME Games is shown in FIG. 5. Region 502 depicts various Google/Android libraries. Region 504 depicts a programming and configuration model for enterprise applications. Region 506 is a library that provides for advertisements, utilities, and statistics. Region 508 is a library that provides advertisements and statistics. Region 510 is a library that provides utilities, statistics, and application management. Regions 512 and 514 are libraries that provide advertisements and statistics. Region 516 is a library that provides utilities, statistics, and application management. Region 518 is where the actual game code is found. Region 520 depicts a programming and configuration model for enterprise applications. Region 522 is a library that provides utilities. Region 524 includes malicious code. A significant amount of the code included in the .smali information depicted in FIG. 5 was provided by a third party (i.e., not authored by the game developer).

Figure 4:
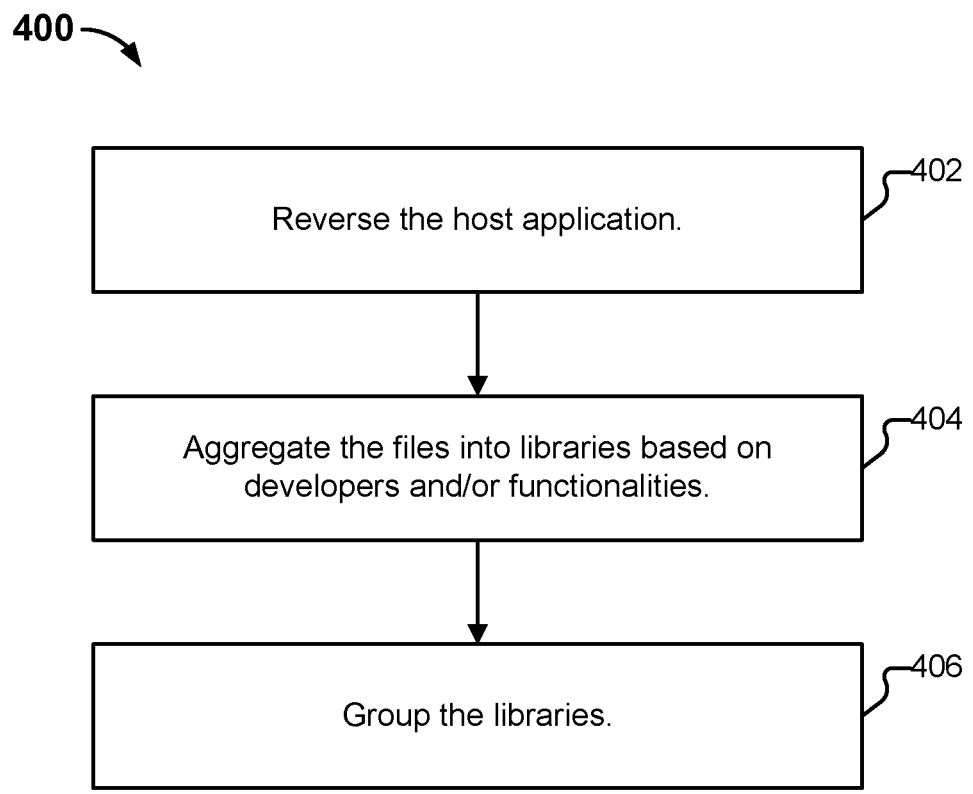
FIG. 4 illustrates an embodiment of a process for performing static analysis on a mobile device application.

Returning to process 400 shown in FIG. 4, at 404, static analysis engine 306 is configured to aggregate the reversed code (including resource files) into different libraries by analyzing the structures and organizations of the reversed information. At 406, static analysis engine 306 groups the libraries (e.g., based on their developers and/or functionality). As will be described in more detail below, members of the different groups can be treated differently (e.g., both during static and dynamic analysis).

A variety of techniques can be used to determine the aggregated libraries (404) and groupings (406), such as with respect to the .smali output shown in FIG. 5. As one example, code in a reversed APK can be aggregated into libraries based on connection relationships between the code (e.g., relations can be found in the AndroidManifest.xml file). As another example, a set of heuristics can be applied. Examples of such heuristics are as follows:

Heuristic 1: Aggregate code based on its class name hierarchy relationship. In the directory of reversed host APK, .smali files are organized by their class names. For example, the file "d.smali" in class "a.b.c" will have a directory structure as "/a/b/c/d.smali." All smali code under "/a/b/c" is treated as belonging in the same library.

Heuristic 2: The receiver entry code that launches the application likely belongs to the "core group." The libraries that belong to the core group handle most of the UI interactions and configurations.

Heuristic 3: Every .smali file includes one class name for the file itself, and a list of classes that are refered to in this file. The class name (and any files that have references to it) can be aggregated into one library.

Heuristic 4: Every host APK has a unique package name. Code with the same name as the package name is aggregated into one library and that library is included in the common group.

Heuristic 5: The structure of well-known popular libraries can be determined through statistical analysis. As examples, the information shown in FIG. 5 can be divided into libraries "com.google" (Google libraries 502), "com.h2" (an enterprise app development framework 504), "com.inmobi" (mobile ads library 514), "com.flurry" (mobile ads library 512), "org.codehaus.jackson" (utility library 522), "com.ACMEGames" (the part implementing the game 518), etc.

Heuristic 6: A library is grouped into the "unrecognized" group if it shares a name with a popular common library but its code is different from that popular library. One way this can be accomplished is by collection 314 including hashes or other information about common libraries, such as "com.android.vending.billing," and comparing the code alleging to be "com.android.vending.billing" included in game.apk against the information stored in collection 314.

Heuristic 7: Libraries included in the common group are selected based on statistics obtained across a large collection of applications. In some embodiments, the set of common libraries is cultivated (e.g., by contacting the official authors of the libraries or otherwise obtaining canonical versions of the libraries). The common libraries can be subdivided based on the functionality they provide, and that functionality can be used for classifying the applications that incorporate those libraries. Examples of such classifications include: Utilities (e.g., "android.support.v4," "com.android.vending.billing"), Ads (e.g., "com.inmobi," "com.flurry"), Social Networking (e.g., "com.facebook.android," "twitter4j"), App Marketing (e.g., "com.appbrain"), Game Development Framework, etc.

Heuristic 8: Code belonging to the same library will have many inter-references, and code belonging to different libraries should have no or very few connections. As a result, a threshold value of connections between two source files can be used to determine whether they belong to the same library.

In some embodiments, the grouped libraries are provided as output (e.g., in static analysis report 308) for use during dynamic analysis. As one example, the report for the .smali information shown in FIG. 5 could indicate that the core group for game.apk includes library 518; the common group for game.apk includes libraries 502 (which could be grouped together into a single library or considered as multiple libraries), 504, etc.; and the unrecognized group for game.apk includes library 524.

Other kinds of static analysis can also be performed by static analysis engine 306 for inclusion in the report. For example, in addition to the heuristic rules to be applied on the .smali code for library and grouping purposes, static analysis engine 306 can use heuristic rules to determine which features are hit by the source code. For example, if the APK has duplicate entry names (e.g., containing two classes.dex files in the same folder within the APK) in the file, it is malicious. (E.g., because it is attempting to exploit the Android security vulnerability #8219321.) Examples of features include the following (where an example of "the host APK" is "game.apk"):

1. "Contain APK file": If the received APK contains other APK files within the package, the host APK is suspicious.

2. "Contain Known Malicious APK File": If there exists other APK files within the package, those included APK files are analyzed separately (e.g., are added to the queue or checked with existing known malicious applications). If any of the included APK files are determined to be malicious, the received APK is considered malicious as well.

3. "Hide Menu Icons": The menu icons are graphical elements placed in the options menu. If the received APK does not have the menu icons or attempts to hide the menu icons, it is suspicious.

4. "File Type Mismatch": If the received APK contains files whose formats do not match their extensions, it is highly suspicious (of maliciousness). For example, several Android malware families (e.g., Android.Droiddream family) attempt to hide additional included APK files as database files by naming them with the ".db" extension rather than ".apk." As another example, a file labeled a ".png" may instead be an ".xml" file used for a command and control channel. As explained below, a developer may inadvertently misname a file (or otherwise misname a file without malicious intent).

5. "Contain Executable Files": If the received APK contains executables for the Linux platform (e.g., the .elf files), it is suspicious.

6. "Contain Malicious Executable Files": If the included executable files are known malicious files, e.g., known exploit libraries, the received APK is malicious.

7. "Install Other APK": If the received APK has the capacity of installing other APK files (e.g., while running in the background), it is suspicious.

8. "Uninstall Other APK": If the received APK has the capacity of uninstalling other APK files (e.g., while running in the background), it is suspicious.

9. "Contain Dangerous Shell Commands": If the received APK contains dangerous shell commands, e.g., chmod and su, it is malicious.

10. "Require Abnormal Permissions": If the received APK requires permissions such as "system debug," or "authenticate accounts," and/or factory adjustments such as setting process limits, it is suspicious.

11. "Contain Phone number": If the received APK contains phone number(s), it is suspicious (e.g., because the application may place calls or text messages to premium numbers).

12. "Contain URLs": If the received APK contains URL(s) within the source code, it is suspicious.

13. "Contain Malicious URL": Any URL(s) found are compared against a list of known malicious sites. If the URL(s) link to malicious site(s), the received APK is malicious.

14. "Send SMS": If the APK has the permission to send SMS messages, it is suspicious.

15. "Contain Autorun.inf file": If the received APK contains an autorun.inf file that is for the Windows platform, it is malicious (e.g., because an attempt will be made by the user's computer to execute the file if the user connects the phone to the computer).

16. "Duplicate Entries": If the APK has duplicate entry names (e.g., containing two classes.dex files in the same folder within the APK) in the file, it is malicious. (E.g., because it is attempting to exploit the Android security vulnerability #8219321.)

In some embodiments, static analysis engine 306 takes into account the group to which a library responsible for a feature hit belongs when determining whether a given hit is suspicious or malicious. One example is where a library in the common group includes code for certain "suspicious" activities (e.g., hiding or attempting to hide menu icons, or calling/containing additional executable files, or including a phone number) that could be resolved by the static analysis engine as not suspicious. In some embodiments, at least some feature hits will be treated as malicious, irrespective of which classification of library (e.g., core, common, or unrecognized) includes the code. One example is: "contains malicious URL."

Repackaging

Overview

Applications produced by tools such as the official software development kits (SDKs) have structural differences from applications produced by repackaging tools. Two kinds of structures an application can include are as follows: code-related structure and build-related structure. The code-related structure includes file structures and/or file content related to the specified application's code/functionality. The build-related structure is independent of the code.

A representation of contents of an Android APK file is shown in FIG. 6. A given Android APK typically includes the following:

a classes.dex file, which contains executable code used by Android's Dalvik virtual machine. The header of a DEX file (an example of which is shown in FIG. 7) includes a checksum, signature, file_size, and header_size. A DEX file further includes a string list (also referred to as a string table), an example of which is shown in FIG. 8. For each item in the string table, the offset of the string is provided (as string_data_off). A DEX file further includes a map list (also referred to as a map table), an example of which is shown in FIG. 9 at 902. Each item in the table has a name, a size value, and an offset value. In the map table shown in FIG. 10, the highlighted item (1002) is named TYPE_STRING_ID_ITEM with size 2187 and offset 112. Here, the size and offset are code-related structures because they are decided by the application's executable code's length and offset. The name, however, is a build-related structure because it is a fixed, predefined value from Android's Dalvik virtual machine and will not change between different applications' code/functionality. Further, the order of these items in the table is a build-related structure, because it is also independent of the code/functionality of the application. A DEX file further includes a class definition table, an example of which is shown in FIG. 11. Each item in the table defines a Java class (either an interface class or not). For example, class_def[0] (1102), class_def[1] (1104), and class_def[2] (1106) are interfaces (because they have the property of "interface" or "abstract"). And, class_def[3] (1108), class_def[4] (1110), and class_def[5] (1112) are not interfaces. Each class definition has a static field size (1114), instance field size (1116), direct method size (1118), and virtual method size (1120). Each method in the class includes a code_off (1122), which indicates the offset of the binary code for the method.

an AndroidManifest.xml file, which contains manifest/configurations of the application. The file has an Android internal file format typically called AXML or Android binary XML format.

a META-INF/directory, which contains certificates and code signature files in accordance with the Java JAR standard. The CERT.SF file is included in this directory. The CERT.SF file is a plaintext file that includes a cryptographic digest of each file included in the APK. An example CERT.SF file is shown in FIG. 12. The second line of the file (line 1202), which reads "Created-By: 1.0 (Android SignApk)," is an example of a build-related structure.

a lib/directory, which contains native code (in the ELF file format) for architectures such as ARM, x86, etc.

Build Process—Original APK

Using Android applications as an example, the build process (e.g., using the official Android SDK) is as follows: (1) A developer writes source code in Java or C/C++, and writes or designs additional resources in plaintext or in multimedia file formats. (2) The developer uses the aapt tool in the Android SDK to compile plaintext resources into binary format "compiled resources." (3) The developer uses the standard Java compiler (javac tool) in JDK to compile Java source code to .class files. These files will be converted by the dx tool in the Android SDK to the classes.dex file. (4) The developer uses the apkbuilder tool in the Android SDK to combine resources, classes.dex, and other files in to a ZIP format package file (an unsigned APK package). (5) The developer uses the jarsigner tool in the Android SDK to sign the APK package, producing a signed APK package (i.e., resulting in an original APK). (6) Optionally, the developer can use the zipalign tool in the Android SDK to align uncompressed data within the APK on 4-byte boundaries. Other toolkits can be used and result in original APKs, and the techniques described herein adapted accordingly. For example, alternate compilers and/or signing tools can be used and still result in original APKs.

Build Process—Repackaged APK

An example build process for a repackaged APK is as follows: (1) The repackager disassembles the target original APK file to assembly code (e.g., in .smali syntax) and plaintext resources. (2) The repackager adds, deletes, or modifies the assembly code and/or resources for specific (e.g., attack) purposes. (3) The repackager assembles the changed assembly code and compiles the resources again, combining them into a new APK package. (4) The repackager signs the new APK package using signer tools, resulting in a repackaged APK.

Detection

Figure 13:
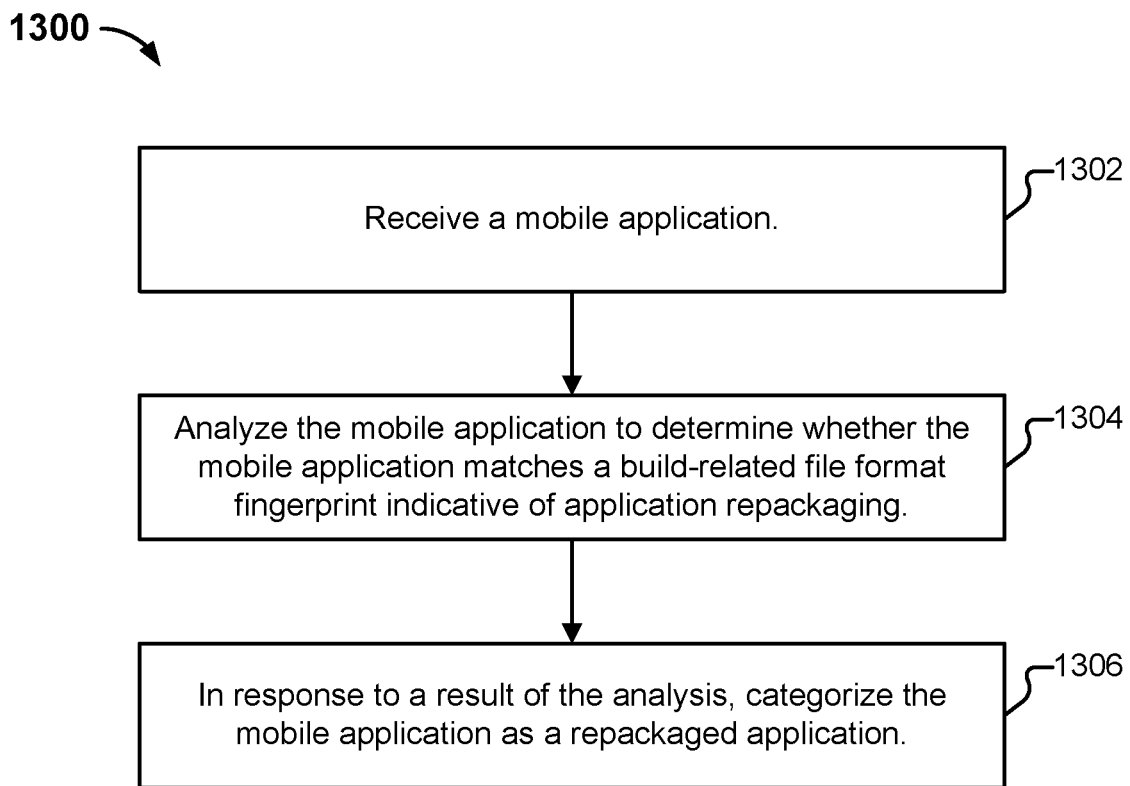
FIG. 13 illustrates an embodiment of a process for examining applications for structural indications of repackaging.

FIG. 13 illustrates an embodiment of a process for examining applications for structural indications of repackaging. In various embodiments, process 1300 is performed by static analysis engine 306. Process 1300 can also be performed by other devices/systems. For example, process 1300 can be performed by data appliance 102 (e.g., within module 112 or as a separate/distinct module). Process 1300 is lightweight (e.g., in CPU and memory consumption) and can also be run on client devices (e.g., executing a real time detection software application implementing repackaging detection techniques).

Process 1300 begins at 1302 when a mobile application is received. As one example, a mobile application is received at 1302 by static analysis engine 306 in conjunction with the ingestion described above. As another example, where process 1300 is executing on a device such as device 104, 106, or 108, a mobile application is received at 1302 (e.g., for real time analysis) by the respective device when a copy of the application is requested (e.g., by an end user) and transmitted to the respective device (e.g., in conjunction with a download by a user of the respective device of the application from platform 134). As yet another example, where process 1300 is executing on appliance 102, a mobile application is received at 1302 (e.g., for real time analysis) when a copy of the application (e.g., as requested by device 104 or 106) passes through appliance 102.

At 1304, the received application is analyzed to determine whether the application matches a build-related file format fingerprint indicative of application repackaging. As one example, for a given APK file, static analysis engine 306 examines the META-INF/CERT.SF file and parses the DEX file for classes.dex. Other kinds of file formats can also be examined with respect to build-related structure using the techniques described herein, such as the ELF file format (used by native executable files and shared libraries in Android APK files) and the ART file format (used by Android ART runtime). The analysis can also be performed by other components. For example, where process 1300 is performed on device 104, 106, or 108, code executing on the respective device can be configured to examine the META-INF/CERT.SF file and parse the DEX file for classes.dex. A variety of "fingerprints" are usable to detect repackaging. In some embodiments, if a match against any of the fingerprints indicates repackaging, the application is classified as being repackaged (e.g., at 1306). In other embodiments, heuristics/voting are employed to determine whether a package is repackaged or not (e.g., 1306). As one example, a match against some fingerprints may conclusively indicate that a file is original (or repackaged), but a match against that same fingerprint may be inconclusive. An example of such a fingerprint is fingerprint 5. For such fingerprints, in some embodiments, multiple fingerprints must be matched in order for an APK to be classified as repackaged (or original, as applicable). In various embodiments, the categorization decision made at 1306 is included in static analysis report 308 (and/or otherwise recorded, e.g., in database 140). The categorization can also be separately stored or not stored (e.g., and used to make a real-time decision). For example, where process 1300 is performed on device 108 or appliance 102, the categorization may be kept only temporarily, in conjunction with making a decision as to whether to allow the installation of the application on an end device.

The following are seven example fingerprints. Of note, the below fingerprints are file-independent, and do not rely on access to/knowledge of any specific APK files. Accordingly, the repackaging detection techniques described herein can be used to detect repackaged APKs for which knowledge of the corresponding original APK is not known (i.e., can be used to detect zero-day malware and related threats).

Repackaging Fingerprint 1

In the META-INF/CERT.SF file, in an APK package, if the package is signed by the official Android SDK, the second line of the file will be (of the form) "Created-By: 1.0 (Android)." An example of the second line of an original APK's CERT.SF file is shown in FIG. 14A. Repackaging tools typically use SignApk for signatures, and will have a second line, instead, of "Created-By: 1.0 (Android SignApk)." An example of the second line of a repackaged APK's CERT.SF file is shown in FIG. 14B. A given application can be classified as original or repackaged based on the second line of the META-INF/CERT.SF file accordingly.

Some legitimate developers/companies use automatic integration systems to build and test their mobile applications. These systems use building tools either from the official Android SDK or from third-parties. Applications produced using these integration systems may evidence characteristics of repackaging, however, classifying them as repackaged applications may be considered a false positive (i.e., they should be classified as original applications). One approach to this situation is to apply a whitelist mechanism. Two examples of whitelists are as follows and can be used to prevent original applications developed and built by well-known companies from being classified as repackaged.

The first whitelist is a certificate whitelist. Android applications are signed using Java JAR's standard code signing mechanism. Legitimate applications (i.e., from large companies/popular developers) will include a certificate in the APK package. In various embodiments, system 300 includes a list (316) of trusted certificates that are known belong to popular application developers (e.g., developers that publish applications which have been downloaded at least 5 million times in the Google Play store). Some examples of such developers with whitelisted certificates include: Google Inc., Samsung Electronics Ltd., HTC Corporation, Acer Inc., Tencent Technology (Shenzhen) Company Ltd., WhatsApp Inc., Instagram, Gameloft, and Facebook. If an application is signed by a certificate in this whitelist, in some embodiments, it is automatically classified as original, regardless of whether it would otherwise be classified as repackaged (e.g., based on detection results against any fingerprints).

The second whitelist is used by fingerprint 1. Some companies use their own Java JAR code signing tools internally. These tools will produce META-INF/CERT. SF files that are different from those produced using the official Android SDK. A whitelist of such companies can be included with respect to the first fingerprint accordingly, and include entries such as:

Created-By: . . . (Apple Inc.)
Created-By: . . . (Google Inc.)
Created-By: . . . (IBM Corporation)
Created-By: . . . (Motorola Inc.)
Created-By: . . . (Intel Corporation)
Created-By: . . . (The FreeBSD Foundation)
Created-By: . . . (signatory)
Created-By: . . . (Semcsc)
Created-By: . . . (IAIK Jar Signer)

For example, if the second line of the META-INF/CERT.SF file begins with "Created-By:" and ends with "(Apple Inc.)," the classification result of fingerprint 1 (because of the whitelist) would be original other than repackaged.

Repackaging Fingerprint 2

In the classes.dex file, there is a string table in the DEX format. Each item in the table has a field that points to the offset to related string data. When the package is compiled by the Android SDK (i.e., is an original APK), all offset values in the table are strictly increasing. An example of the strictly increasing values is shown in FIG. 15A, which represents a portion of an original APK's string table. When the package is compiled/generated using repackaging tools, such as apktool, the offset values in the table do not strictly increase. An example of values not strictly increasing is shown in FIG. 15B, which represents a portion of a repackaged APK's string table.

Repackaging Fingerprint 3

In the classes.dex file, there is a map table in the DEX format. Each item in the table has a field named type, which indicates which type the map item represents. When the APK is compiled using the Android SDK (i.e., is an original APK), the second to last item in the map table has a type of DEBUG_INFO, as seen in FIG. 16A, which represents a portion of an original APK's map table. When the APK is compiled/generated using repackaging tools, the second to last item in the map table has a type of something other than DEBUG_INFO, as seen in FIG. 16B, which represents a portion of a repackaged APK's map table.

Repackaging Fingerprint 4

Also in the map table, when the APK is compiled using the Android SDK, the item with type TYPE_LIST will have a position before the item with type STRING_DATA_ITEM. This is seen in FIG. 17A, which is a representation of a portion of a map table for an original APK. When the APK is compiled/generated by other tools, the order of these two is swapped. This is seen in FIG. 17B, which is a representation of a portion of a map table for a repackaged APK.

Repackaging Fingerprint 5

In the header of a DEX file, two included fields are: file length and header length. When the APK is compiled using the Android SDK, the file length field's value will be exactly the same as the DEX file's actual length, and the header length field's value will exactly be either 0x70 or 117. This is seen in FIG. 18A, which is a representation of a portion of a DEX file from an original APK. When the APK is compiled/generated by other tools, the file length field's value may not be exactly the same as the DEX file's actual length, and/or the header length field's value may not be either of 0x70 and 117. This is seen in FIG. 18B, which is a representation of a portion of a DEX file from a repackaged APK.

Repackaging Fingerprint 6

In the header of a DEX file, two included fields are: the Adler32 checksum of the rest data, and the SHA-1 hash value of the rest data. When the APK is compiled using the Android SDK, the first checksum and the second hash value will all be valid regarding related data in the DEX file. This is seen in FIG. 19A, which is a representation of a portion of a DEX file from an original APK. When the APK is compiled/generated by other tools, the first checksum and/or the second hash value may be invalid regarding related data in the DEX file. This is seen in FIG. 19B, which is a representation of a portion of a DEX file from a repackaged APK.

Repackaging Fingerprint 7

In the class definition table, method list, and code header, various fields describe fields and methods implemented by any Java class, code block for any method, and code instructions' positions of code blocks. When the APK is compiled using the Android SDK, all non-interface classes will have at least one method or one field; all methods not belonging to the interface class will point to a valid offset of code header other than 0; all code headers will point to a valid offset of code instructions other than 0. This is seen in FIG. 20A, which represents an original APK. When the APK is compiled/generated by other tools, some non-interface classes may have no method and/or no field; some methods which do not belong to the interface class may point to 0 as the code header's offset; or some code headers will point to 0 as the offset of code instructions. This is seen in FIG. 20B, which represents a repackaged APK.

Generating Repackaging Fingerprints

Seven example fingerprints (e.g., used in process 1300) are described above. Additional/alternate fingerprints can also be used, and can be created by analyzing differences in file format between original APK files and repackaged APK files. Three approaches to producing repackaging fingerprints are as follows:

Fingerprint production approach 1: Use documentation of file format/schema to automatically generate candidate fingerprints, then use a set of known original APKs and a set of repackaged APKs (e.g., included in collection 314) to filter the candidate fingerprints such that only fingerprints which do not match normal applications and do match at least some repackaged applications remain. For example, the META-INF/CERT.SF files of many APKs can be examined in accordance with fingerprint production approach 1.

Fingerprint production approach 2: Compare repackaging tools' source code (e.g., the source code of apktool) to corresponding source code of Android SDK. Differences in CFG, critical code blocks, and constant values/strings can be used as fingerprints.

Fingerprint production approach 3: Examine Android SDK's source code to generate fingerprints that will *not* match an APK built using the Android SDK.

Examples of distinctions between original and repackaged files that can potentially be used for fingerprint generation are as follows:

In the file format, if a field can contain many similarly formatted entries in the same level, the sort order of the entries, and/or order between any two or more entries, can potentially be used to differentiate original/repackaged files.

In the file format, the validity of any integrity verification mechanisms (e.g., by content hash value or by cross reference) can potentially be used to differentiate original/repackaged files.

In the file format, where a field can have many different valid values (e.g., by format definition), which value is in fact used can potentially be used to differentiate original/repackaged files.

In the file format, if a field's value is defined as a constant value (e.g., a fixed string or magic number), which constant value is in fact used can potentially be used to differentiate original/repackaged files.

Returning to FIG. 3, the static analysis engine stores the results of the rule testing a database (e.g., database 140) in the record associated with the application being tested (and/or includes the results in report 308 as applicable). In some embodiments, the static analysis engine also forms a verdict with respect to the application (e.g., "safe," "suspicious," or "malicious"). As one example, the verdict can be "malicious" if even one "malicious" static feature is present in the application. As another example, if the only "suspicious" code is attributable to libraries included in the common group, and no "malicious" code is found, the verdict can be "safe." As yet another example, points can be assigned to each of the features (e.g., based on severity if found; based on how reliable the feature is for predicting malice; etc.) and a verdict can be assigned by static analysis engine 306 (or the coordinator, if applicable) based on the number of points associated with the static analysis results. In this example, points can be assigned differently based on library groupings. For example, a "suspicious" hit from code in the unrecognized group can be assigned a higher score than a "suspicious" hit from code in the common group. As yet another example, the verdict can be "original" or "repackaged" (e.g., where static analysis engine 306 is configured to analyze applications for repackaging, only, without additional regard for maliciousness).

In some cases, an application may appear "suspicious" to static analysis engine 306 due to poor programming choices made by a harmless programmer, rather than a malicious one. As one example, the programmer may have named an executable that handles playing of an MP3 file with a ".mp3" extension. This sort of filetype mismatch (i.e., that an executable is incorrectly labeled with a non-executable extension) could indicate malicious behavior (i.e., a malicious individual is trying to hide a malicious executable through misnaming the filename). Here, however, the file was inadvertently mislabeled. Static analysis engine 306 notes (e.g., with rule "File Type Mismatch" being included in the static analysis report) that there is a "suspicious" aspect to the file which warrants additional investigation during dynamic analysis to reach a conclusion as to whether the application is benign or malicious.

In some embodiments, static analysis engine 306 will conclude that the application will crash (and/or cause the virtual machine to crash) if executed. As one example, static analysis engine 306 can perform integrity checking and determine that a file is missing, corrupted, unsigned, etc. In this scenario, dynamic analysis can be skipped (e.g., with static analysis noting in report 308 that the application will crash if an attempt is made to install/execute it).

Dynamic Analysis

Once the static analysis is complete, coordinator 304 locates an available dynamic analysis engine 310 to perform dynamic analysis on the application. As with static analysis engine 306, system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a mobile device emulator (e.g., running in a virtual machine). Results of the static analysis (e.g., performed by static analysis engine 306), whether in report form (308) and/or as stored in database 140, or otherwise stored are provided as input to dynamic analysis engine 310. The static report information is used to help customize the type of dynamic analysis performed by dynamic analysis engine 310, conserving resources and/or shortening the time required to evaluate an application. As one example, if static analysis has concluded that the application does not have the ability to access SMS messages, during dynamic analysis, the receipt of SMS messages will not be simulated in some embodiments. As another example, if static analysis has concluded that the only access the application has to a sensitive permission (e.g., the ability to read SMS messages) is via a library included in the common group, and is not via libraries in the core or unrecognized group, certain triggering actions (e.g., the receipt of SMS messages) can similarly not be simulated. As another example, if static analysis has concluded that the application has the ability to access GPS information, during dynamic analysis, various changes in location of the device can be simulated. However, if the application lacks the ability to access GPS information, in some embodiments no location changes will be simulated (reducing the amount of time/computing resources needed to complete dynamic analysis). Similarly, even where the application has the ability to access GPS information, if that information is only accessed via a library included in the common group, in some embodiments no location changes will be simulated.

Dynamic analysis engine 310 can determine which emulator(s) to run based on the minimum operating system version number required by the application (and determined during static analysis). If the minimum version number is Android 4.0, dynamic analysis engine 310 will launch an Android emulator having that version number (and, in some embodiments, will not attempt to emulate a lower version of Android). If the minimum version number is Android 2.3, multiple emulators can be used to evaluate the application (e.g., Android 2.3, and any higher versioned emulators, such as Android 4.0). Where multiple emulators are used, a single dynamic analysis engine can manage all of the emulators (whether in sequence or in parallel), or multiple dynamic analysis engines can be used (e.g., with each managing its own emulator), as applicable.

Figure 21:
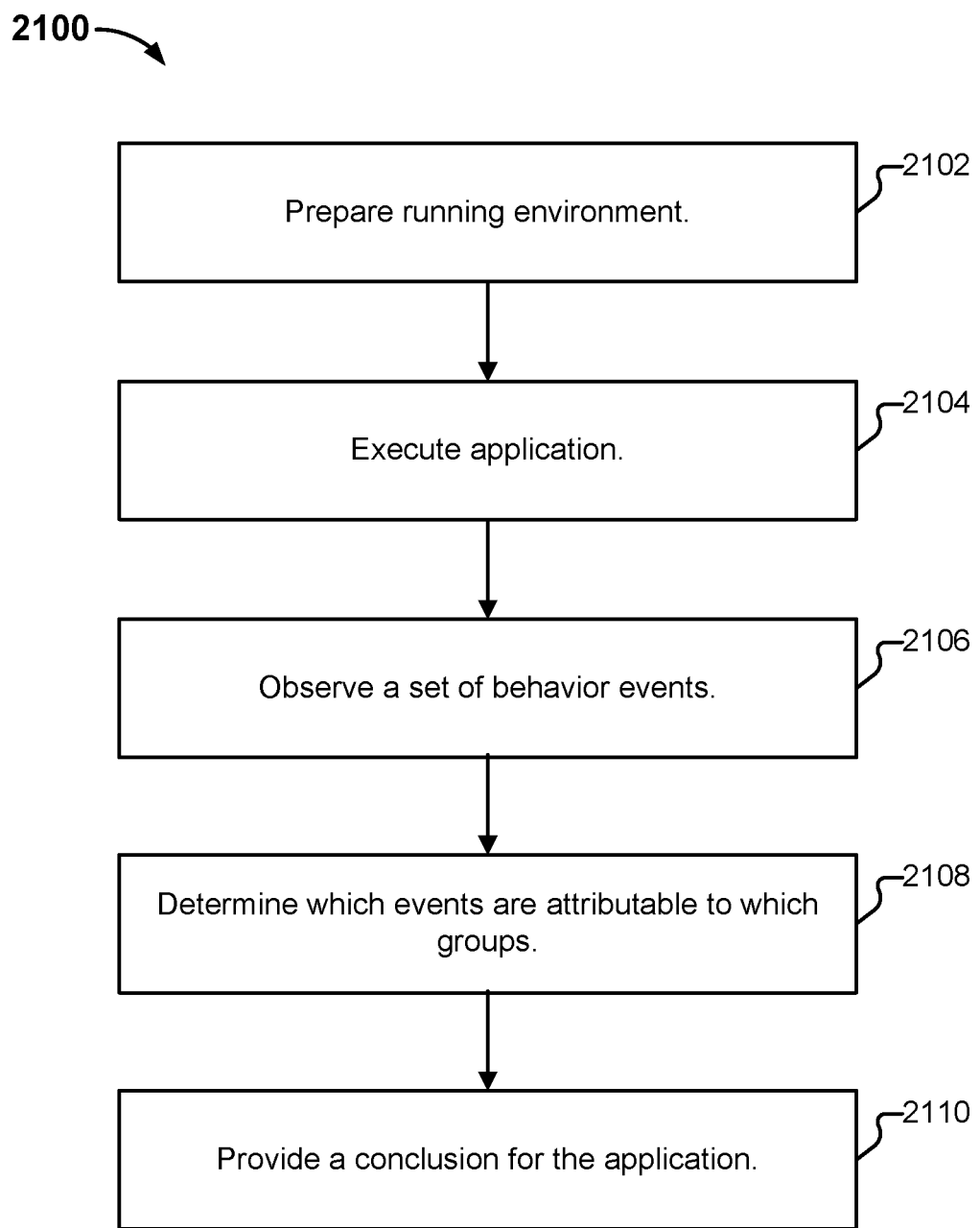
FIG. 21 illustrates an embodiment of a process for performing dynamic analysis on a mobile device application.

One example of how dynamic analysis can be performed on an application is as follows, and described in conjunction with the process shown in FIG. 21. The dynamic analysis engine/worker begins analysis by preparing and setting up the running environment for the application to be tested (2102). As explained in more detail below, the environment is instrumented/hooked such that behaviors observed while the application is executing are logged and which libraries/classes are responsible for which behaviors is tracked. Examples of operations carried out by the dynamic analysis engine/worker at 2102 include: (1) determining which system services should be started (e.g., simulated motion sensor readings and simulated location changes); and (2) determining what set of simulated user operations should take place (e.g., performed after installation, in sequence).

The dynamic analysis engine/worker loads an appropriate emulator (e.g., Android version 2.3) and installs the application to be analyzed. As mentioned above, the emulators used by mobile malware analysis system 300 are instrumented. For example, they are configured to log activities as they occur in the emulator (e.g., using a customized kernel that supports hooking and logcat). Further, network traffic associated with the emulator is captured (e.g., using pcap). The generated log file (or a separate file associated with the log file, as applicable) indicates which library (and as applicable, which class or other subcomponent within the library) was responsible for the application engaging in a particular behavior. For example, when the application attempts to send an SMS, or access a device identifier, the library responsible for the occurrence of that behavior and its group classification (e.g., core, common, or unrecognized) is known and can be used in analysis. In some embodiments, dynamic analysis is performed in two stages. In particular, after the application has been installed and executed (with associated simulated information/events) and a first log file is created (e.g., "logcat1.txt"), a reboot of the emulator is performed and the application is launched and interacted with again, resulting in a second log file (e.g., "logcat2.txt"). Dynamic analysis engine 310 evaluates both log files, along with any network traffic captured during the two stages (e.g., using pcap).

Returning to process 2100, the application is executed (2104) and various applicable actions (e.g., selected based on static analysis report 308) are performed (e.g., by the dynamic analyzer executing commands via an Android Debug Bridge ("adb") connection and/or through the use of a service coordinator included in the modified emulator and configured to orchestrate the simulation of user events such as button presses as commanded by the dynamic analysis engine). As one example, if the application was determined during static analysis to have access to location information, changes in location will be simulated in the emulator. Any resulting behaviors performed by the application are logged (2106). In some embodiments, the log data is stored as a temporary file on system 300. As explained above, the dynamic analysis engine is provided with group identity information as a result of the earlier performed static analysis. Thus for example, a read of a device identifier performed by a library included in the common group is differentiable (2108) from a read of a device identifier performed by a library included in the uncommon group (whether core group or unrecognized group). When the device identifier read is performed by a library in the common group (e.g., performed by a well-known advertising library), that behavior can be considered not suspicious (i.e., is expected). In contrast, when the device identifier is read by a library in the uncommon group (whether core or unrecognized) that behavior is potentially malicious. As another example, an access of device contacts is permissible by a common group library. It may also be permissible where the main purpose of the application (i.e., functionality included in core group libraries and explicitly stated in the description of the application (e.g., appearing in the manifest or on platform 134)) is to be a contact manager. In contrast, where the read is performed by a library included in the unrecognized group, the behavior is highly suspicious.

As with the static analysis engine, the dynamic analysis engine stores the results of its analysis in the database in the record associated with the application being tested (and/or includes the results in report 312 as applicable). As will be described in more detail below, a variety of conclusions (also referred to herein sometimes as verdicts) can be made with respect to analyzed applications (e.g., at 2110). In some embodiments, a final conclusion associated with the application is made (e.g., based on a combination of report 308 and report 312) by coordinator 304. Additional detail regarding various examples of conclusions that can be made based on techniques described herein will now be provided.

Example Conclusions

Malware Verdicts

A variety of approaches can be used to determine whether an application is malicious. As one example, the verdict can be "malicious" if even one "malicious" dynamic feature is present in the application. As another example, points can be assigned to each of the features (e.g., based on severity if found; based on how reliable the feature is for predicting malice; etc.) and a verdict can be assigned by dynamic analysis engine 310 (or the coordinator, if applicable) based on the number of points associated with the static analysis results. Considerations such as to which group a library responsible for a suspicious action belongs can be taken into account in determining a maliciousness verdict. For example:

When a host APK requires permissions to access a GPS, it may be the case that access is required by the developer (i.e. code in the core or unrecognized groups) or by well-know common libraries (i.e. code in the common group). Using the techniques described herein, a request for this sensitive privilege by code included in the core or unrecognized groups can be treated as more suspicious (whether in static analysis, dynamic analysis, or both) than a request made by code in included in the common library.

When a library is encountered with the same library name as a common library, but different code from that common library, the scenario is highly suspicious (i.e., that the library was injected with malicious code). As mentioned above, one way of tracking this information is by maintaining certificates or other verifications of canonical forms of common libraries and comparing purported common libraries (e.g., during static analysis) against the verified versions.

As explained above, different weights can be applied to feature hits by different libraries/groups. For example, the feature of "uploading a device ID to a remote website" when performed by a library included in the common group can be assigned a low weight (or score of zero, as applicable), since the library was authored by a renowned developer (who is, e.g., likely to be responsible for its code). However, the same feature hit performed by a library included in the unrecognized group can be assigned a much higher weight (e.g., contributing to a much higher maliciousness score). The use of different weights based on the library's grouping lowers the false positive rate and improves the detection rate.

In some embodiments, behavior taken by code in the core group is treated with less suspicion than when the same behavior is taken by code in the unrecognized group. Here, by virtue of being executed by code in the core group, the behavior is highly related to the application's main purpose. And, a user of the application is highly likely to be aware of the sensitive operations (if any) performed by code in the core group. In some embodiments, information such as the application's description on platform 134, its description in a manifest file, etc., are considered in evaluating the suspiciousness of an action. As one example, if the application is found (e.g., in dynamic analysis) to be "attempting to check if the phone is rooted," and the description of this application on platform 134 includes phrases such as "may need rooted device," then the attempts to determine whether the device is rooted would not be considered as suspicious behavior. As another example, as explained above, if the application purports to be a contact manager, and is described as being a contact manager on platform 134, then attempts by the application to access contacts (i.e., performed by core group libraries) are less suspicious than where the application is described as being a flashlight and the attempts to access contacts are performed by unrecognized group libraries.

Application Classification

In addition to classifying applications based on threats (e.g., "safe" or "malicious"), applications can be further classified based on their functionality. For example, as mentioned above, applications that include common advertising libraries can be classified as "adware" in addition to whatever functionality they provide. As another example, an application that includes common analytical libraries can be classified (or, as applicable, tagged/labeled) as including analytics. As yet another example, the nature of the particular maliciousness can be ascribed to an application (e.g., steals contacts; uploads location information; etc.).

Further, by using techniques described herein, noise caused by third party code can be filtered out (i.e., ignored) to more precisely capture the nature of the host application itself. For example, a given application could include many third party libraries. When considered as a whole, it could be difficult to determine the purpose of the application based on the behaviors it takes and permissions it requires. By examining only the common group and unrecognized group portions of the application, the application's true nature (e.g., as a game, as a social networking application, etc.) can be more readily ascertained.

In some embodiments, in addition to classifying entire applications, system 300 is configured to analyze and store information about common libraries. For example, as mentioned above, canonical versions of common libraries can be obtained (e.g., from official developers) and digital certificates or other verifications made. Prior to inclusion in collection 314, candidate common libraries can be statically and dynamically analyzed by platform 300 (i.e., independent of a specific application). If a purported advertisement library includes code to read contacts or SMS information, these are actions that are different from other advertisement libraries and indicate that the library is problematic (e.g., is spyware). If a purported generic encryption library includes code for making network connections or dynamically loading and executing code, this is also problematic (i.e., the library may contains a backdoor). Further, if a malicious library is found in a mobile application, this mobile application can be identified as malware as well.

Code Similarity Measurement

Code similarity measurements can be used to determine if a host APK attempts to inject a malicious payload into included common libraries, and can also be used to detect repackaged APK files (e.g., where a nefarious individual takes an existing, popular application and makes unauthorized changes, attempting to pass off the unauthorized version as authentic). For example: suppose a list of libraries included in a host application is determined (e.g., at 404 or at 406 of process 400 as applicable). That list can be compared against lists similarly generated for highly popular applications (e.g., applications with millions of downloads from platform 134). If the only differences between the host application and a highly popular application appear in the unrecognized library section of the host application, then the host application is very likely to be a repackaged APK.

When comparing a host application against another application (e.g., to detect a repackaging attack), differences found between the two applications' unrecognized groups can be assigned a higher threat score than differences found between the two applications' core groups. Differences in the unrecognized group are more indicative of payload code added by attackers (e.g., in the repackaging attacks).

An alternate use of code similarity measurements is as follows: Using the grouping information and static/dynamic analysis results, code similarity comparisons can be performed at arbitrary levels using any of a variety of code similarity search techniques. Given a large database of analyzed malicious applications (e.g., stored on platform 300), newly repackaged malware can be located (e.g., generally, as they are uploaded to platform 134) as follows:

1. Suppose app A and app B include a similar core group of libraries. This indicates that both applications are the same application. If app A has an unrecognized group that is not included in app B, and if the unrecognized group is capable of malicious behaviors, a conclusion can be made that app A is a repackaged version of app B and the group of both applications treated with suspicion. (I.e., because the author of both applications is hoping to bait-and-switch app B, which is not malicious, for app A, which is.)

2. Suppose app A and app B have a dissimilar core group of libraries. This indicates that the applications are different from one another. If they have a similar (or identical) unrecognized group, and if that unrecognized group includes suspicious code, a conclusion can be made that both applications were repackaged by the same (nefarious) author.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a set of repackaging fingerprints generated independently of a particular original application, wherein the set of repackaging fingerprints comprises a plurality of predetermined indicators of build-related structure, and wherein said build-related structure is independent of the particular original application's code structure;
receive a mobile application;
analyze the received mobile application for one or more indicators that the received mobile application is a repackaged version of the particular original application, using at least one repackaging fingerprint, including by determining whether the at least one repackaging fingerprint indicates that a repackaging tool was used as a component in generating the received mobile application, including by determining that a second string_data_off value in a string table, that occurs in the string table after a first string_data_off value in the string table, is smaller than the first string_data_off value; and
at least in part, in response to determining that string_data_off values included in the string table do not strictly increase, categorize the received mobile application as a repackaged application; and
a memory coupled to the processor and configured to provide the processor with instructions.

2. The system of claim 1, wherein analyzing the received mobile application further includes determining whether the received mobile application matches a whitelisted fingerprint component and categorizing the received mobile application as not repackaged in response to the determination.

3. The system of claim 1, wherein analyzing the received mobile application further includes determining whether the received mobile application matches a blacklisted fingerprint component and categorizing the received mobile application as repackaged in response to the determination.

4. The system of claim 1, wherein analyzing the received mobile application includes determining whether the received mobile application matches a threshold set of repackaging fingerprints.

5. The system of claim 1, wherein analyzing the received mobile application includes parsing a file format.

6. The system of claim 1, wherein a repackaging fingerprint included in the set of repackaging fingerprints identifies a given application, as a repackaged application, as one in which an item with a first type is positioned before an item with a second type.

7. The system of claim 1, wherein a repackaging fingerprint included in the set of repackaging fingerprints identifies a given application, as a repackaged application, as one in which an actual file length does not match a file length field value.

8. The system of claim 1, wherein a repackaging fingerprint included in the set of repackaging fingerprints identifies a given application, as a repackaged application, as one in which a header length field does not match a predefined value.

9. The system of claim 8, wherein the predefined value is at least one of 0x70 and 117.

10. The system of claim 1, wherein a repackaging fingerprint included in the set of repackaging fingerprints identifies a given application, as a repackaged application, as one in which at least one of a checksum of rest data and a hash value of rest data is valid.

11. The system of claim 1, wherein a repackaging fingerprint included in the set of repackaging fingerprints identifies a given application, as a repackaged application, as one in which at least one of: a class definition table, a method list, and a code header associated with a non-interface class is missing an expected value.

12. A method, comprising:
receiving a set of repackaging fingerprints generated independently of a particular original application, wherein the set of repackaging fingerprints comprises a plurality of predetermined indicators of build-related structure, and wherein said build-related structure is independent of the particular original application's code structure;
receiving a mobile application;
analyzing the received mobile application for one or more indicators that the received mobile application is a repackaged version of the particular original application, using at least one repackaging fingerprint, including by determining whether the at least one repackaging fingerprint indicates that a repackaging tool was used as a component in generating the received mobile application, including by determining that a second string_data_off value in a string table, that occurs in the string table after a first string_data_off value in the string table, is smaller than the first string_data_off value; and
at least in part, in response to determining that string_data_off values included in the string table do not strictly increase, categorizing the received mobile application as a repackaged application.

13. The method of claim 12, wherein a repackaging fingerprint included in the set of repackaging fingerprints identifies a given application, as a repackaged application, as one in which an item with a first type is positioned before an item with a second type.

14. The method of claim 12, wherein a repackaging fingerprint included in the set of repackaging fingerprints identifies a given application, as a repackaged application, as one in which an actual file length does not match a file length field value.

15. The method of claim 12, wherein analyzing the received mobile application further includes determining whether the received mobile application matches a whitelisted fingerprint component and categorizing the received mobile application as not repackaged in response to the determination.

16. The method of claim 12, wherein analyzing the received mobile application further includes determining that the received mobile application matches a blacklisted fingerprint component and categorizing the received mobile application as repackaged in response to the determination.

17. The method of claim 12, wherein analyzing the received mobile application includes determining whether the received mobile application matches a threshold set of repackaging fingerprints.

18. The method of claim 12, wherein analyzing the received mobile application includes parsing a file format.

19. The method of claim 12, wherein a repackaging fingerprint included in the set of repackaging fingerprints identifies a given application, as a repackaged application, as one in which a header length field does not match a predefined value.

20. The method of claim 19, wherein the predefined value is at least one of 0x70 and 117.

21. The method of claim 12, wherein a repackaging fingerprint included in the set of repackaging fingerprints identifies a given application, as a repackaged application, as one in which at least one of a checksum of rest data and a hash value of rest data is valid.

22. The method of claim 12, wherein a repackaging fingerprint included in the set of repackaging fingerprints identifies a given application, as a repackaged application, as one in which at least one of: a class definition table, a method list, and a code header associated with a non-interface class is missing an expected value.

23. A computer program product embodied in a non-transitory computer readable storage medium and comprising computer instructions for:
receiving a set of repackaging fingerprints generated independently of a particular original application, wherein the set of repackaging fingerprints comprises a plurality of predetermined indicators of build-related structure, and wherein said build-related structure is independent of the particular original application's code structure;
receiving a mobile application;
analyzing the received mobile application for one or more indicators that the received mobile application is a repackaged version of the particular original application, using at least one repackaging fingerprint, including by determining whether the at least one repackaging fingerprint indicates that a repackaging tool was used as a component in generating the received mobile application, including by determining that a second string_data_off value in a string table, that occurs in the string table after a first string_data_off value in the string table, is smaller than the first string_data_off value; and
at least in part, in response to determining that string_data_off values included in the string table do not strictly increase, categorizing the received mobile application as a repackaged application.

* * * * *